United States Patent
Gross et al.

(10) Patent No.: US 10,650,400 B2
(45) Date of Patent: May 12, 2020

(54) PAYMENT DATA SYSTEMS AND METHODS

(71) Applicant: VERIFONE, INC., San Jose, CA (US)

(72) Inventors: Jason Gross, New York, NY (US); Senthilkumaran Kanagaratnam, San Jose, CA (US); Jay David Parsons, Los Gatos, CA (US)

(73) Assignee: VeriFone, Inc., San Jose, CA (US)

( * ) Notice: Subject to any disclaimer, the term of this patent is extended or adjusted under 35 U.S.C. 154(b) by 488 days.

(21) Appl. No.: 14/918,835

(22) Filed: Oct. 21, 2015

(65) Prior Publication Data
US 2016/0117715 A1 Apr. 28, 2016

Related U.S. Application Data

(60) Provisional application No. 62/068,920, filed on Oct. 27, 2014.

(51) Int. Cl.
*G06Q 30/00* (2012.01)
*G06Q 30/02* (2012.01)
*G06Q 20/20* (2012.01)
*G06Q 20/34* (2012.01)

(52) U.S. Cl.
CPC ....... *G06Q 30/0238* (2013.01); *G06Q 20/204* (2013.01); *G06Q 20/34* (2013.01); *G06Q 30/0268* (2013.01)

(58) Field of Classification Search
None
See application file for complete search history.

(56) References Cited

U.S. PATENT DOCUMENTS

| | | | |
|---|---|---|---|
| 7,707,113 B1 | 4/2010 | DiMartino et al. |
| 7,784,684 B2 | 8/2010 | Labrou et al. |
| 2003/0126095 A1 | 7/2003 | Allen |
| 2004/0267618 A1 | 12/2004 | Jadicibus et al. |
| 2005/0075689 A1 | 4/2005 | Toy et al. |
| 2007/0174115 A1 | 7/2007 | Chieu et al. |
| 2007/0293192 A9 | 12/2007 | De Groot |
| 2008/0048022 A1 | 2/2008 | Vawter |
| 2009/0138366 A1 | 5/2009 | Bemmel et al. |
| 2009/0167699 A1 | 7/2009 | Rosenblatt et al. |

(Continued)

FOREIGN PATENT DOCUMENTS

| | | |
|---|---|---|
| WO | 2009/009705 | 1/2009 |

OTHER PUBLICATIONS

Oct. 17, 2014 (Oct. 17, 2014), XP055232381, Retrieved from the Internet: URL:https://web.archive.org/web/20141017000624/http://global.verifone.com/solutionsservices/media/payment-enabled-media/ retrieved on Nov. 30, 2015

(Continued)

*Primary Examiner* — Alvin L Brown
(74) *Attorney, Agent, or Firm* — Greenberg Traurig LLP

(57) ABSTRACT

An electronic offer system including a payment instrument reader for reading payment instrument data from a payment instrument and an offer-payment instrument account association (O-PIAA) server communicating with the payment instrument reader and automatically operative in response to reading of the payment instrument data by the payment instrument reader to associate at least one offer in an offer program with a payment instrument account indicated by the payment instrument data.

14 Claims, 26 Drawing Sheets

(56) References Cited

U.S. PATENT DOCUMENTS

| | | | |
|---|---|---|---|
| 2010/0082445 A1 | 4/2010 | Hodge et al. | |
| 2010/0177663 A1 | 7/2010 | Johansson et al. | |
| 2010/0274726 A1 | 10/2010 | Florek et al. | |
| 2011/0093344 A1 | 4/2011 | Burke et al. | |
| 2011/0191184 A1 | 8/2011 | Blackhurst et al. | |
| 2012/0239504 A1 | 9/2012 | Curlander et al. | |
| 2012/0284121 A1* | 11/2012 | Pan | G06Q 20/3274 705/14.53 |
| 2013/0024881 A1 | 1/2013 | Liu | |
| 2013/0151323 A1* | 6/2013 | Shepard | G06Q 30/0222 705/14.23 |
| 2013/0218666 A1* | 8/2013 | Bruich | G06Q 10/10 705/14.45 |
| 2013/0226702 A1 | 8/2013 | Burke | |
| 2016/0048865 A1* | 2/2016 | Poon | G06Q 30/0238 705/14.38 |
| 2017/0004535 A1* | 1/2017 | Weiss | G06Q 30/0259 |

OTHER PUBLICATIONS

An Office Action dated Oct. 8, 2015, which issued during the prosecution of U.S. Appl. No. 14/347,312.
An Office Action dated Feb. 1, 2016, which issued during the prosecution of U.S. Appl. No. 13/774,187.
An Office Action dated Nov. 17, 2015, which issued during the prosecution of U.S. Appl. No. 13/468,686.
European Search Report dated Feb. 11, 2015, which issued during the prosecution of Applicant's European App No. 13157298.4.
European Search Report dated Dec. 18, 2015, which issued during the prosecution of Applicant's European App No. 15190761.5.
U.S. Appl. No. 62/068,920, filed Oct. 27, 2014.

* cited by examiner

FIG. 2A/1
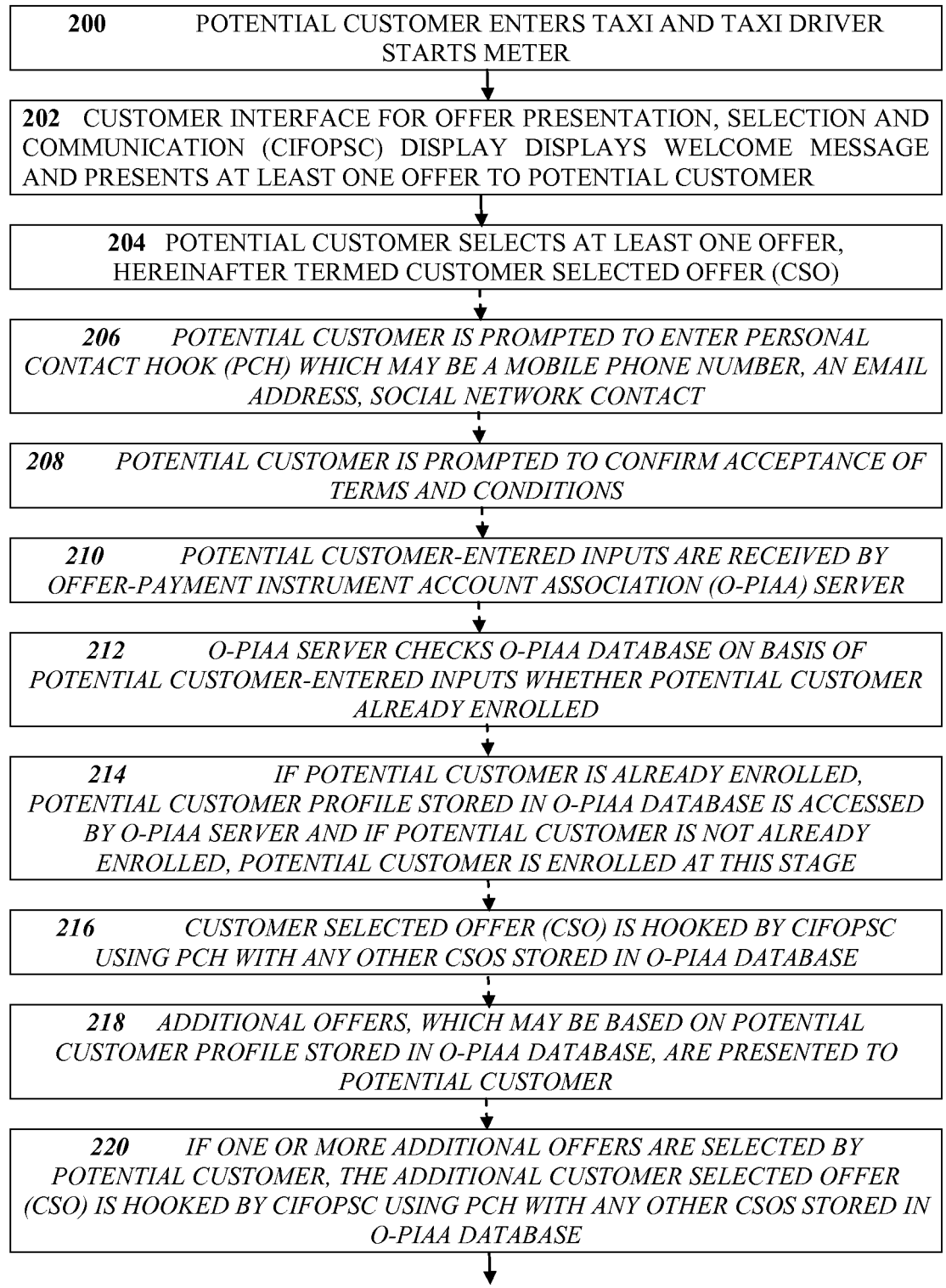

FIG. 2A/2
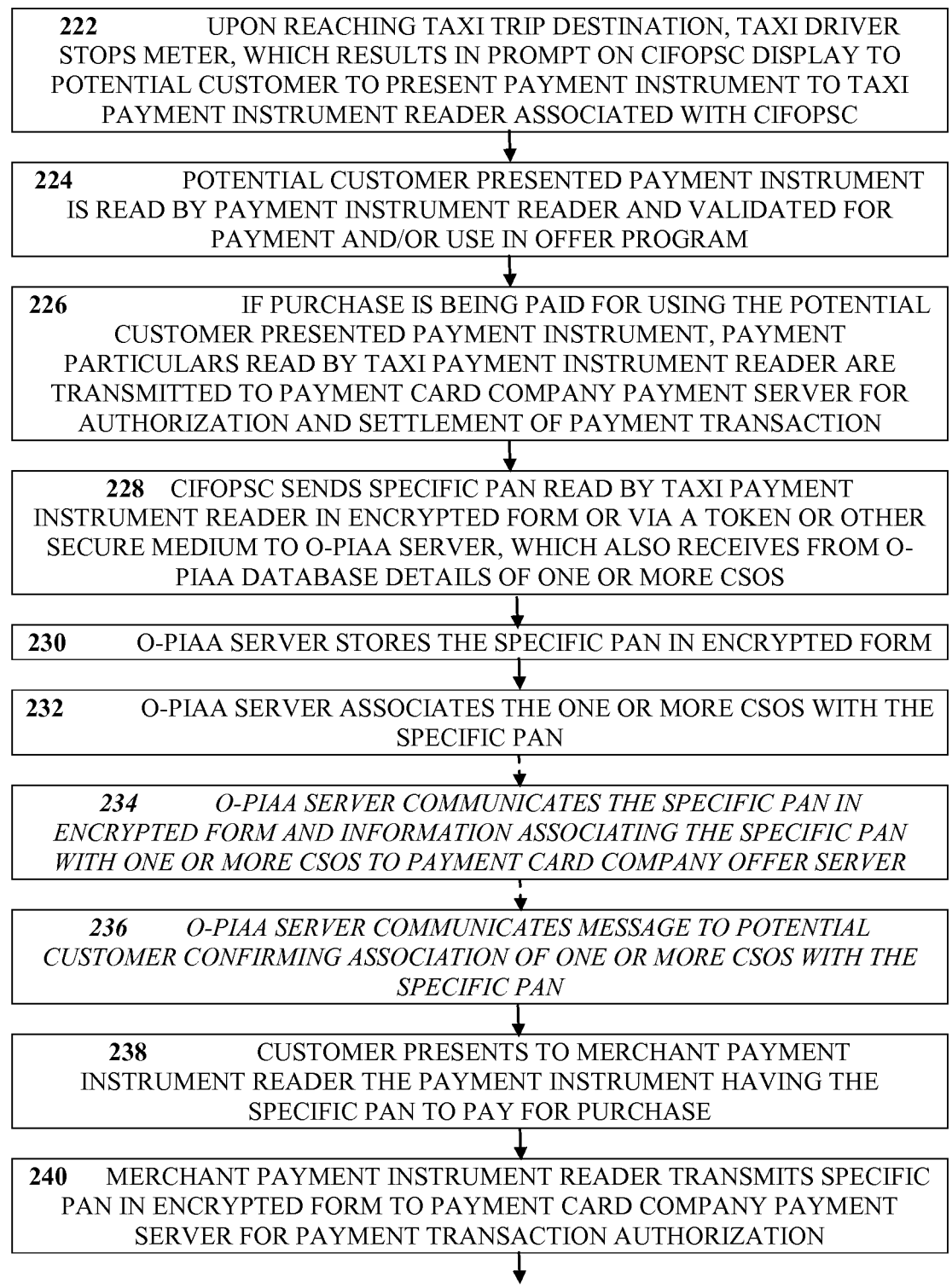

FIG. 2A/3

| 242 | MERCHANT PAYMENT INSTRUMENT READER TRANSMITS TO OFFER SERVER AND/OR O-PIAA SERVER THE SPECIFIC PAN IN ENCRYPTED FORM AND DATA RELATING TO THE PURCHASE WHICH MAY BE OBTAINED FROM MERCHANT BARCODE SCANNER |

↓

| 244 | OFFER SERVER AND/OR O-PIAA SERVER ASCERTAINS WHETHER AT LEAST ONE ITEM PURCHASED IS COVERED BY AT LEAST ONE VALID CSO |

↓

| 246 | IF PURCHASE IS COVERED BY AT LEAST ONE VALID CSO, OFFER SERVER AND/OR O-PIAA SERVER CONFIRMS REDEMPTION OF CSO AND CUSTOMER IS CREDITED ACCORDINGLY |

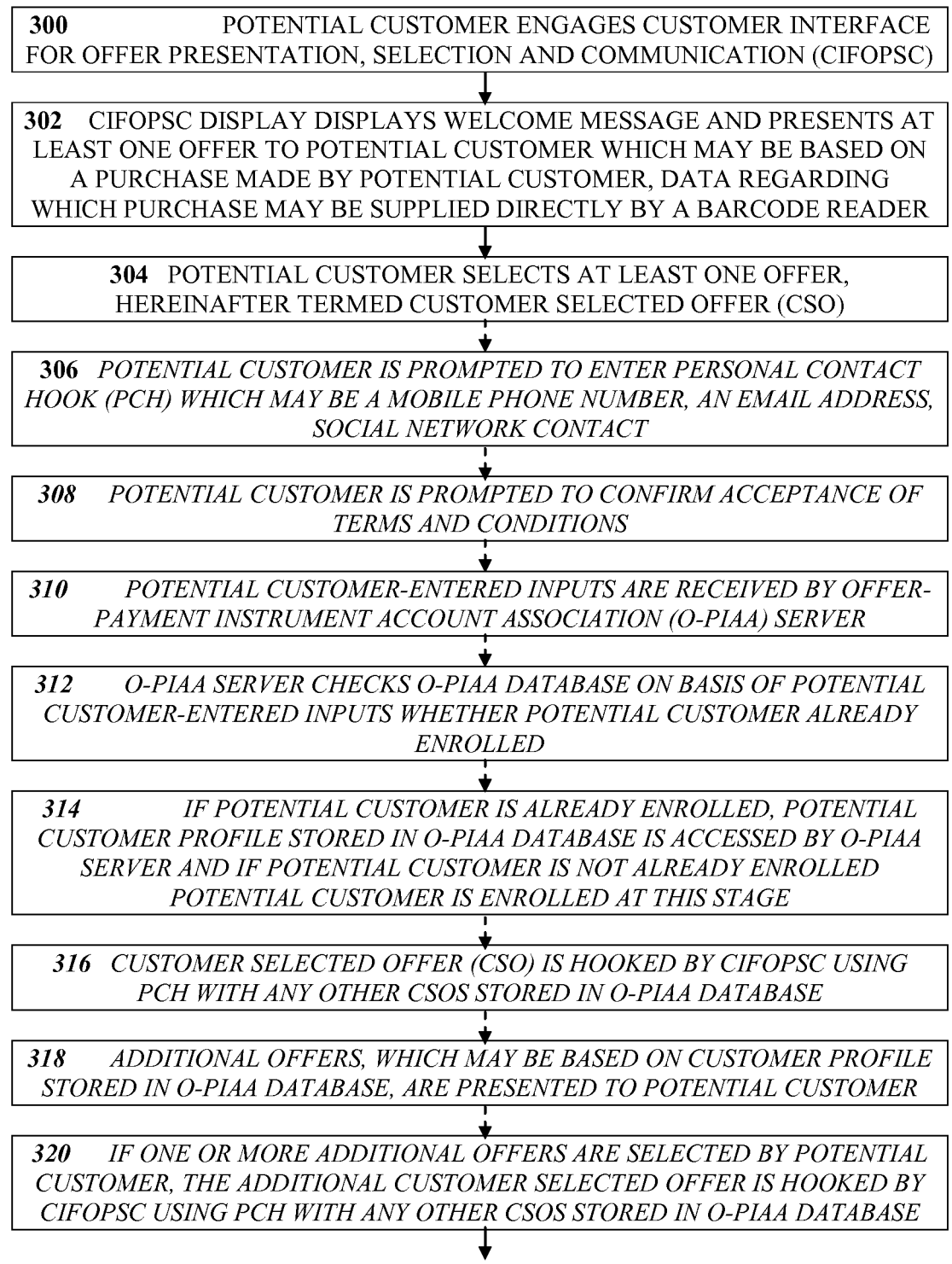
FIG. 2B/1

FIG. 2B/2
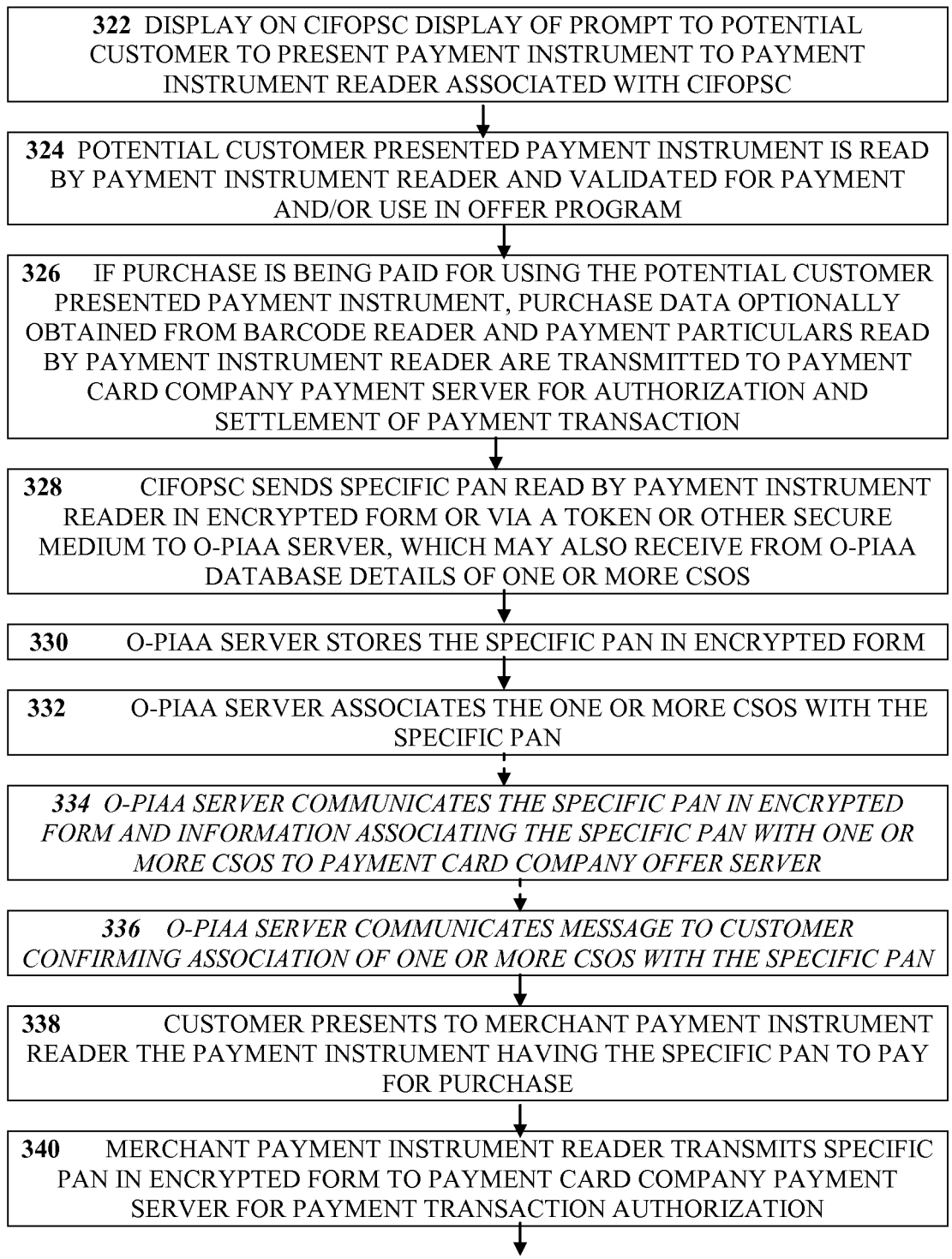

FIG. 2B/3
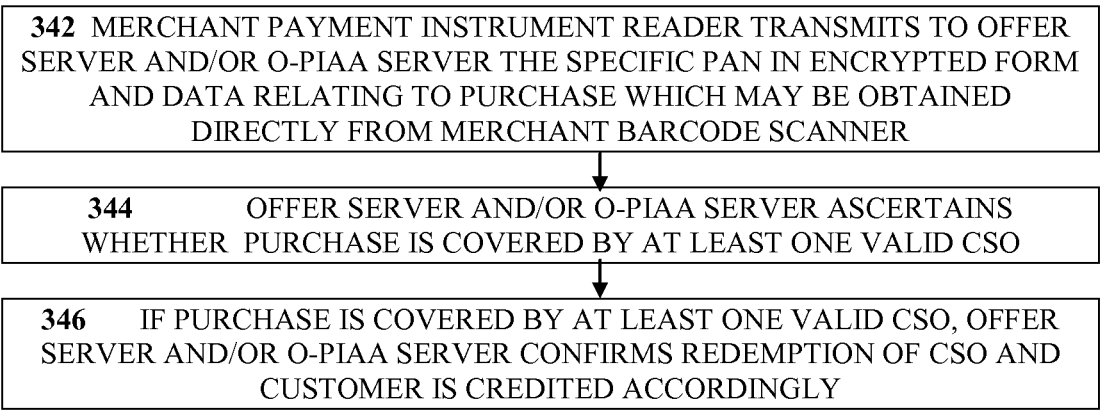

FIG. 2C/1
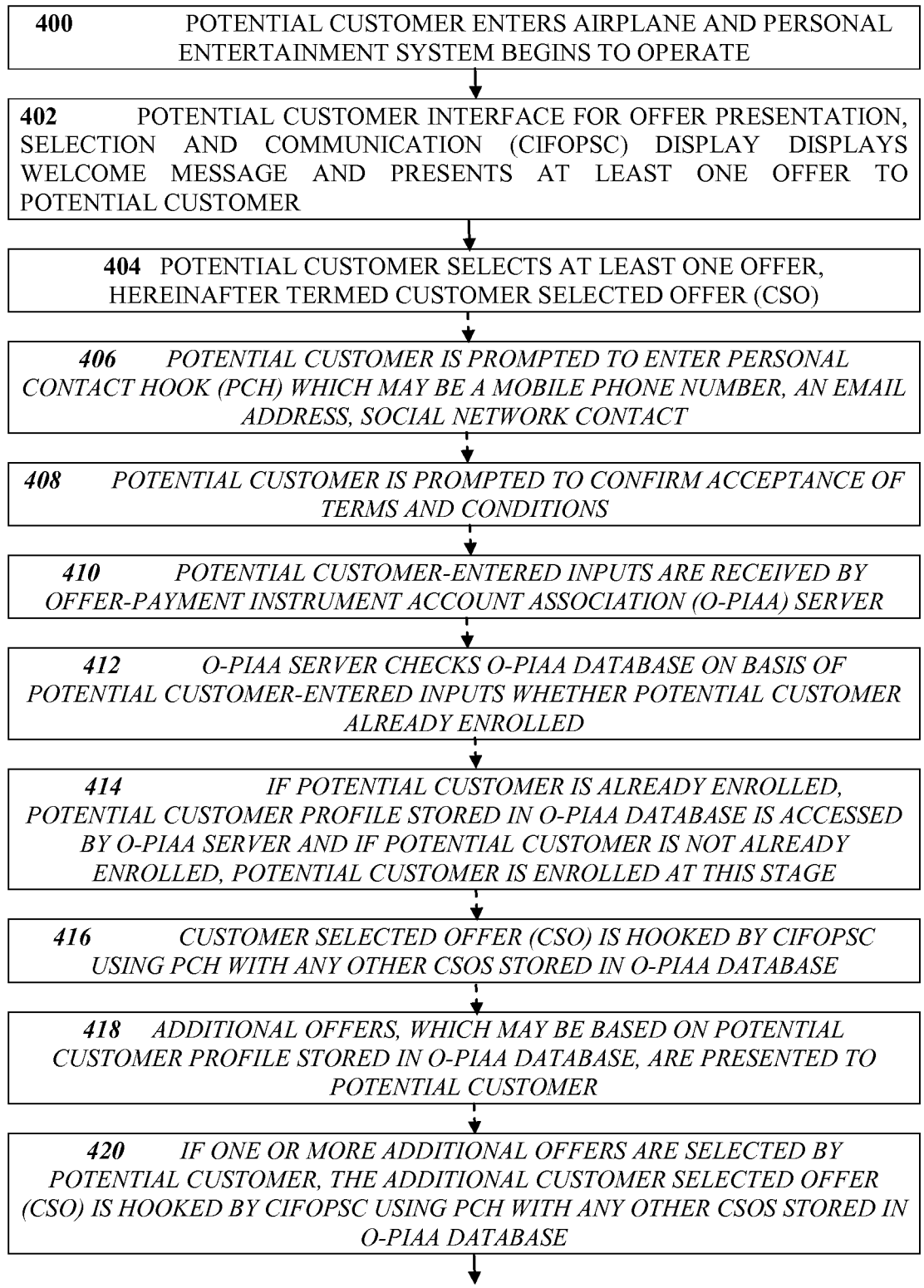

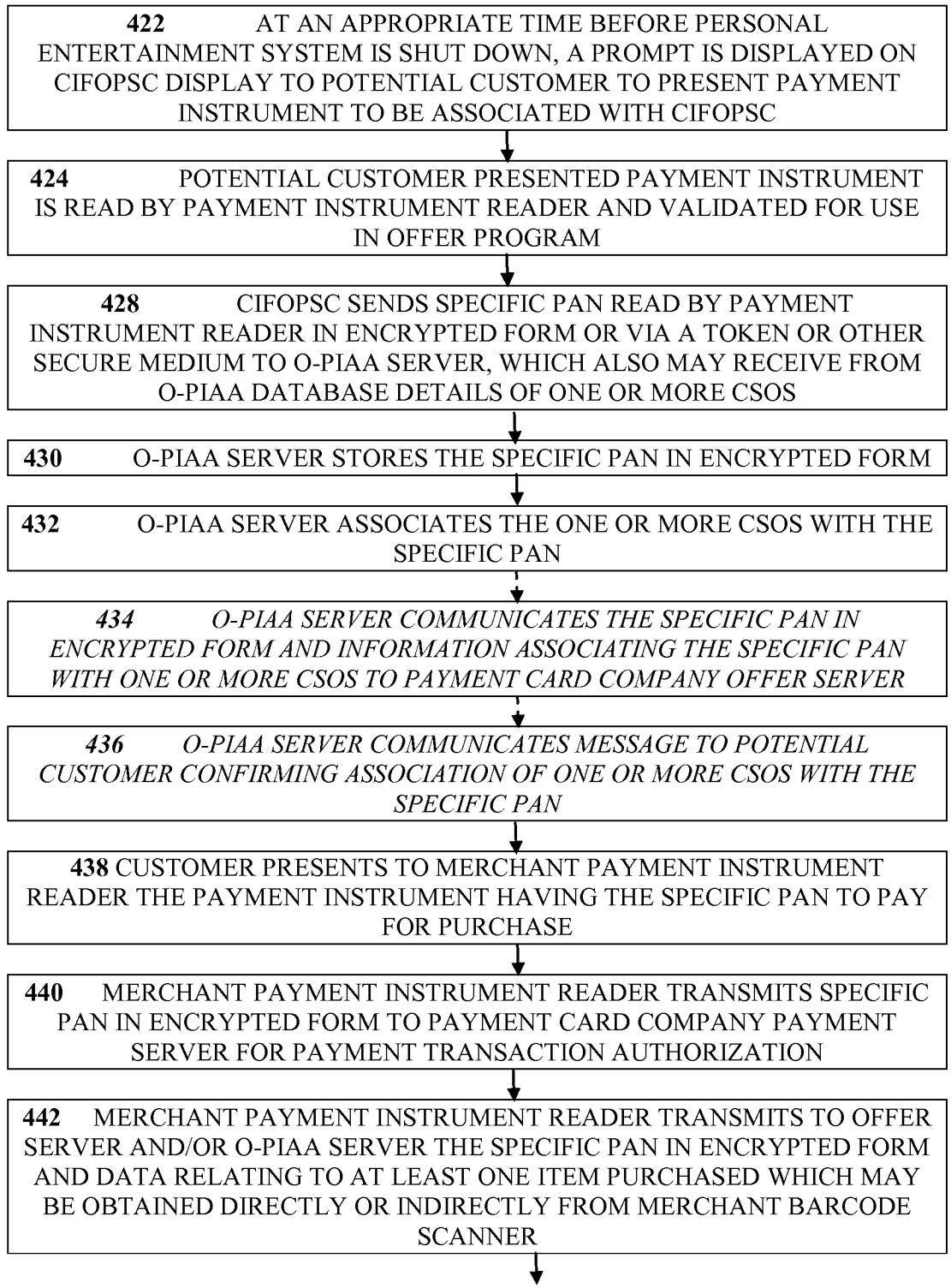
FIG. 2C/2

FIG. 2C/3

| 444 | OFFER SERVER AND/OR O-PIAA SERVER ASCERTAINS WHETHER AT LEAST ONE ITEM PURCHASED IS COVERED BY AT LEAST ONE VALID CSO |

| 446 | IF AT LEAST ONE ITEM PURCHASE IS COVERED BY AT LEAST ONE VALID CSO, OFFER SERVER AND/OR O-PIAA SERVER CONFIRMS REDEMPTION OF CSO AND CUSTOMER IS CREDITED ACCORDINGLY |

FIG. 2D/1
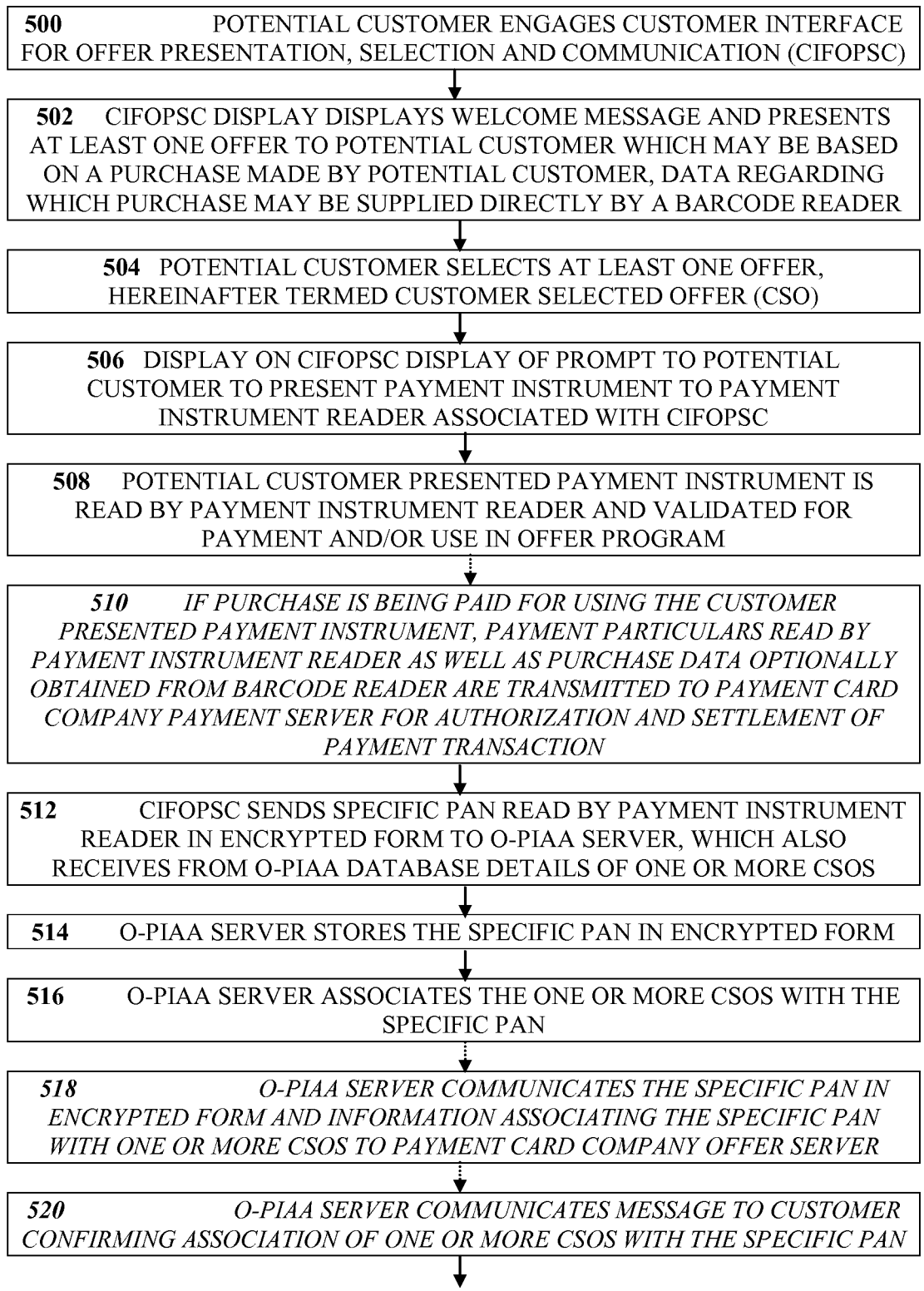

FIG. 2D/2
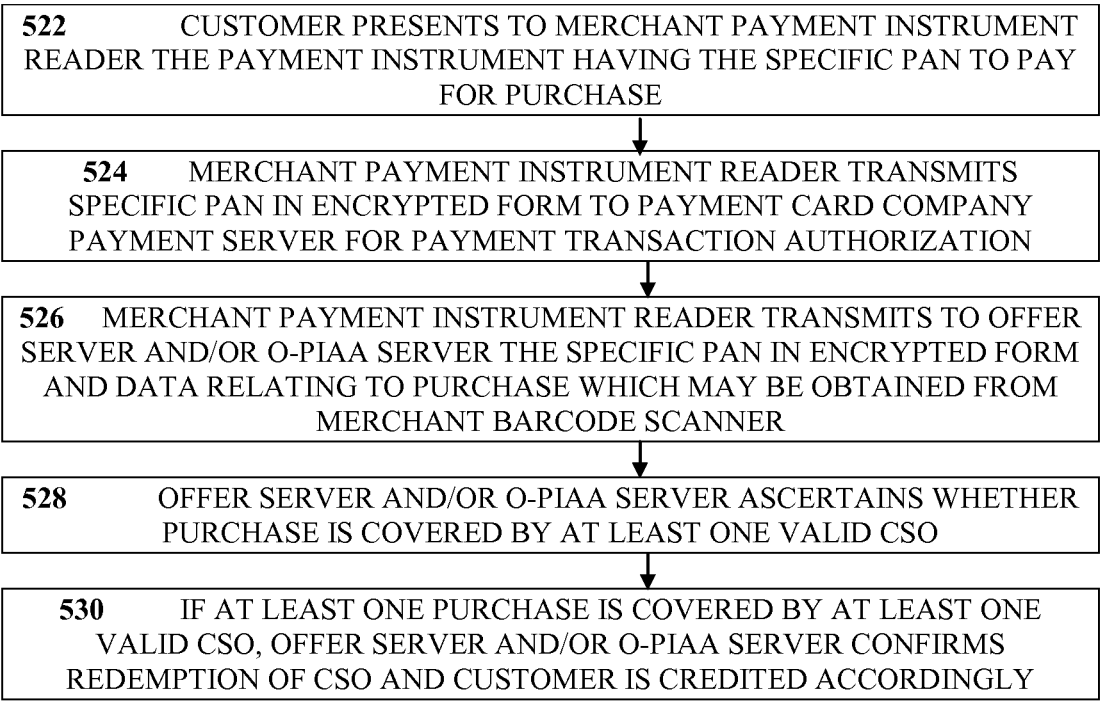

FIG. 2E/1
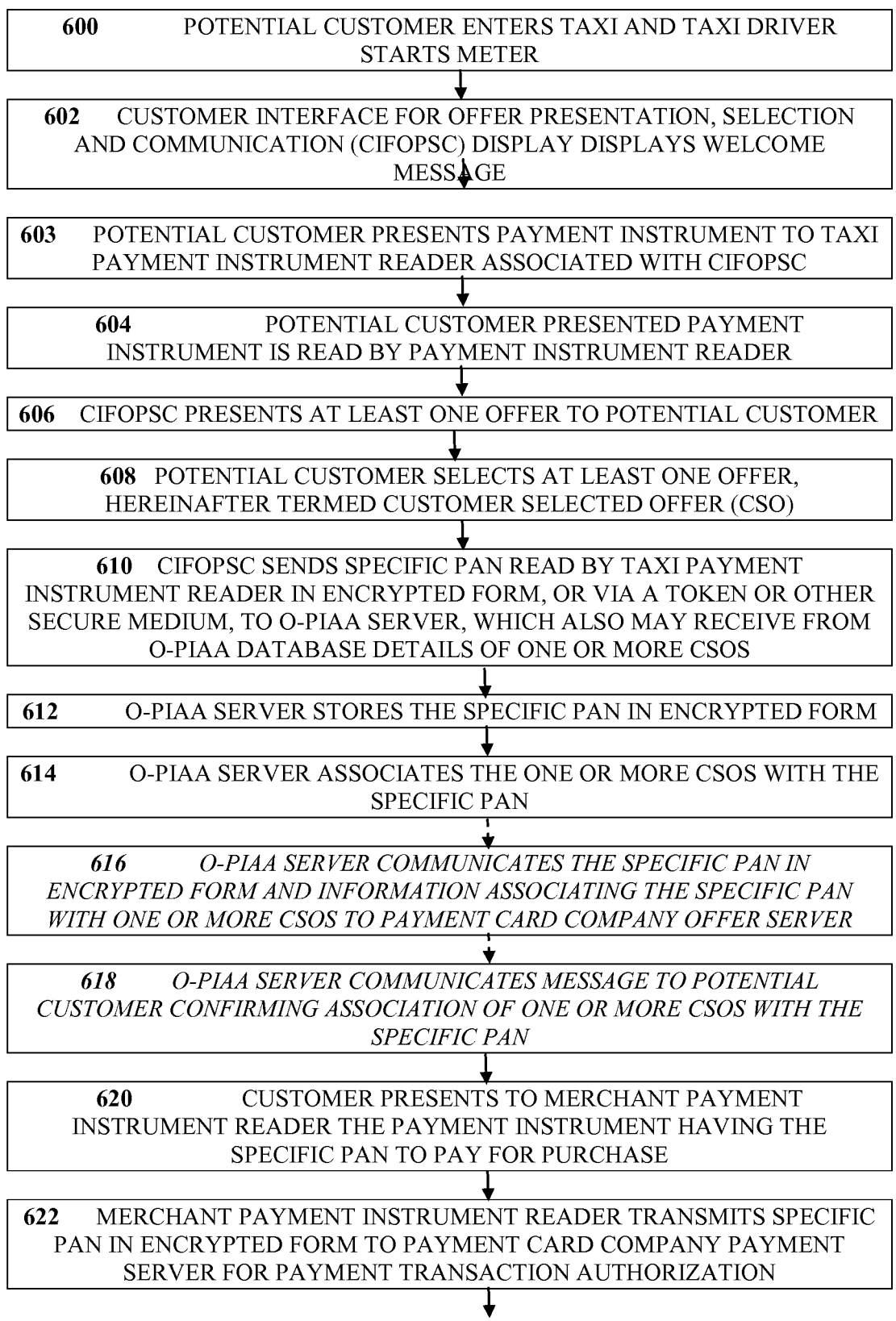

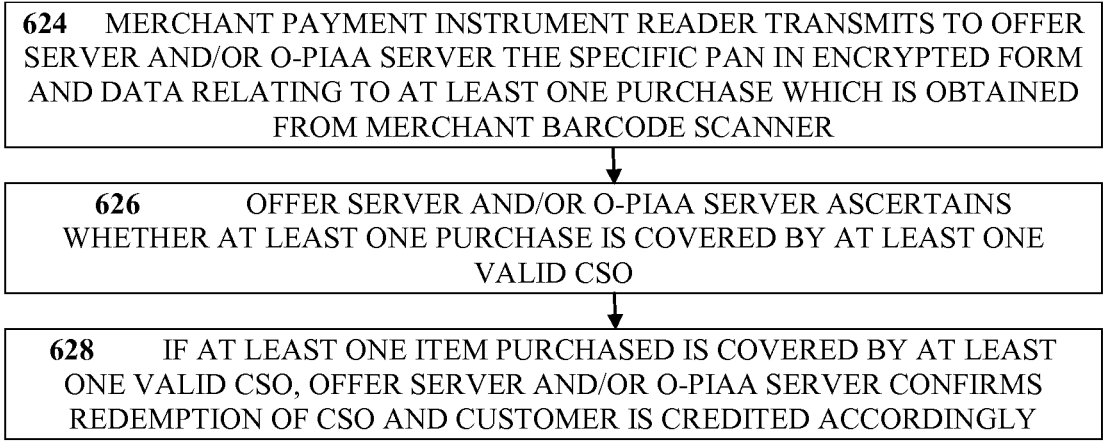
FIG. 2E/2

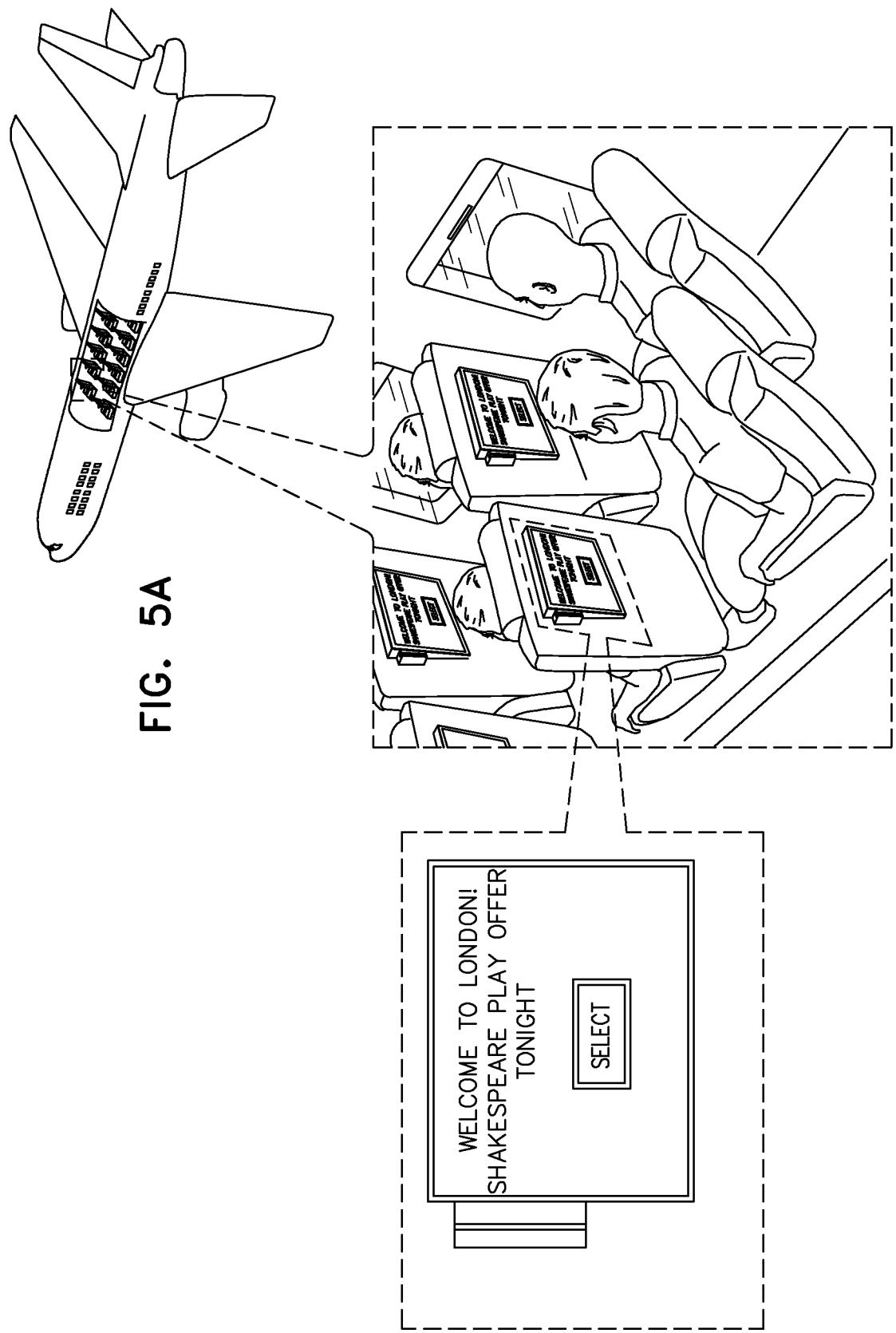

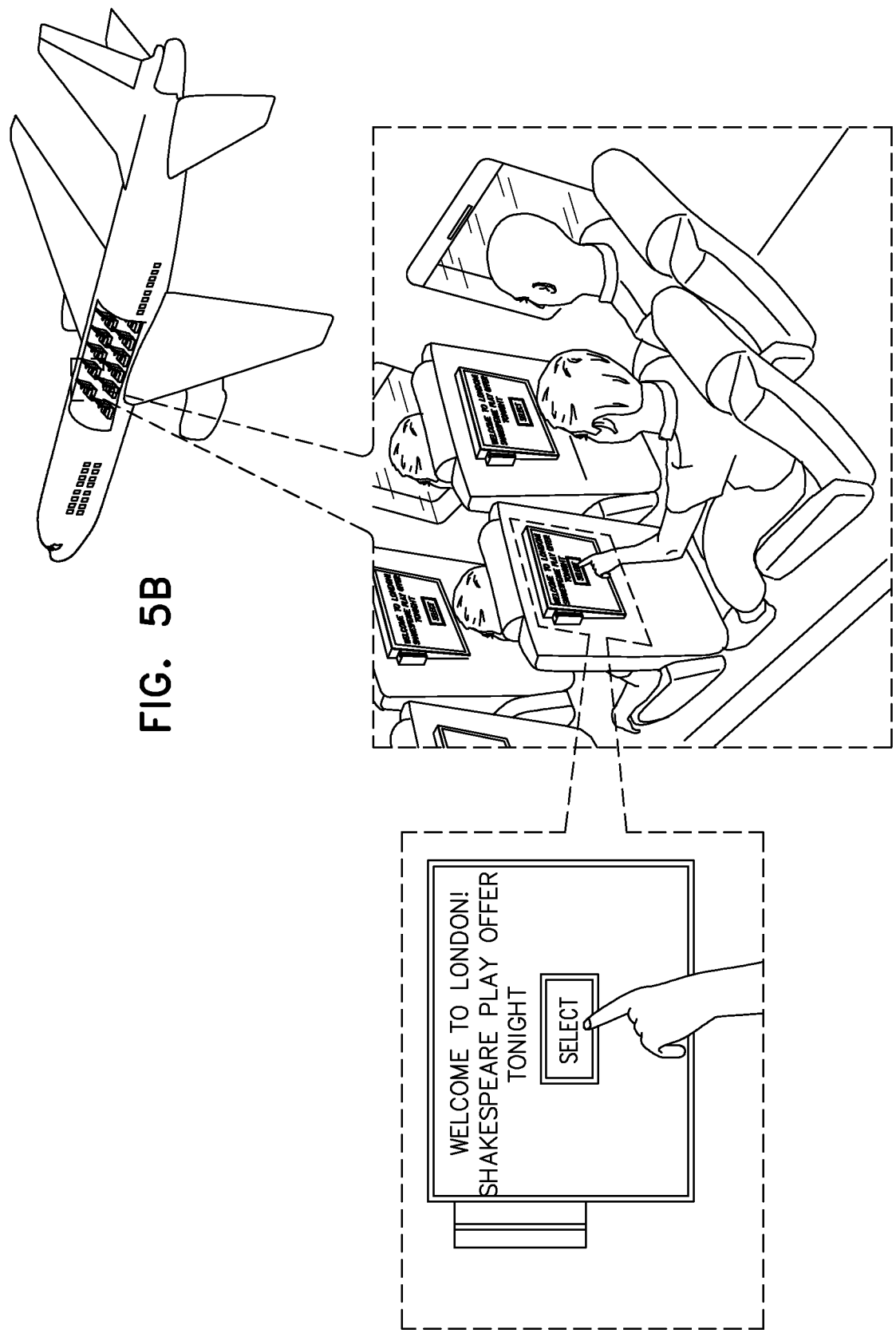

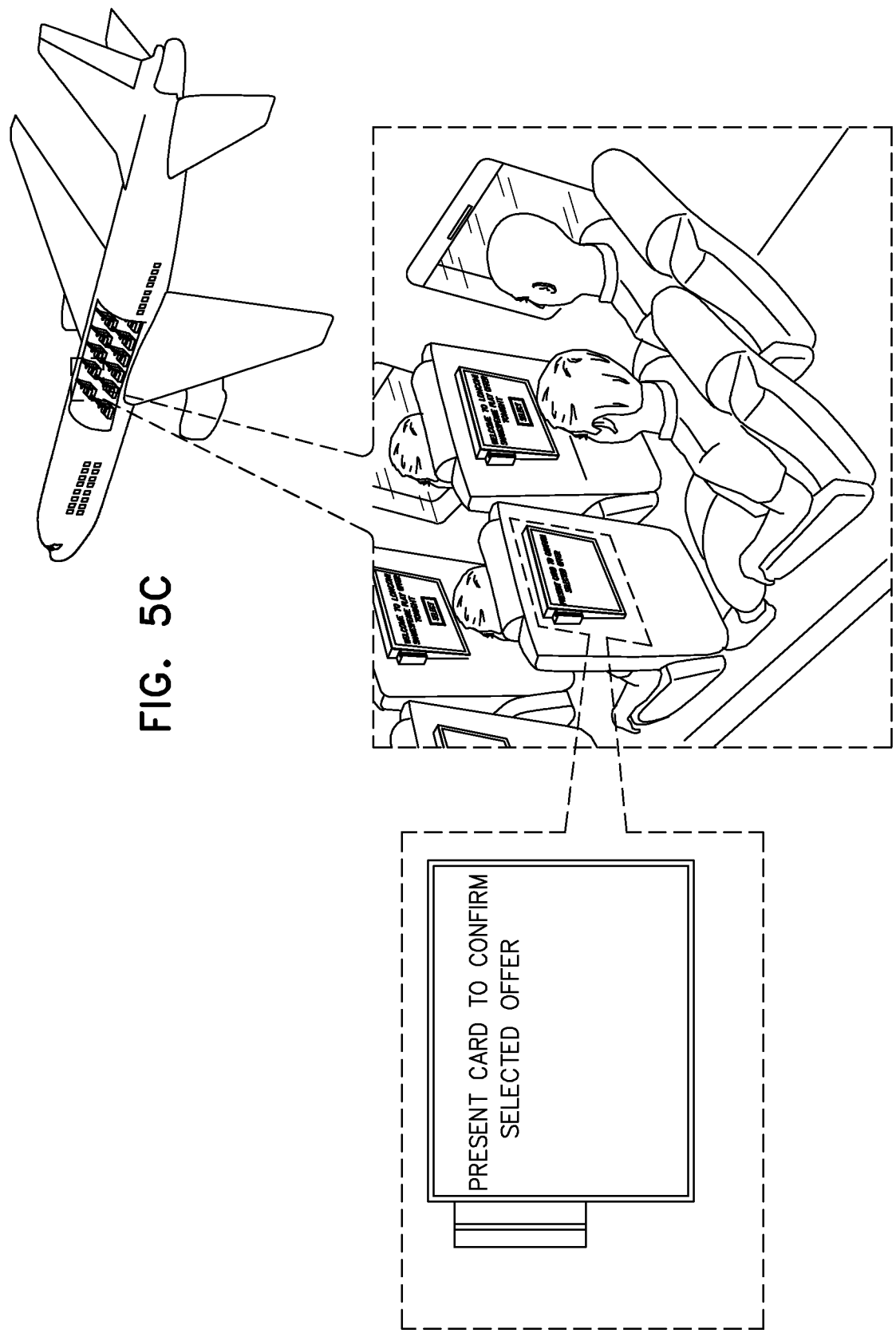

PAYMENT DATA SYSTEMS AND METHODS

REFERENCE TO RELATED APPLICATIONS

Reference is hereby made to U.S. Provisional Patent Application Ser. No. 62/068,920, filed Oct. 27, 2014 and entitled PAYMENT CARD DATA SYSTEMS AND METHODS, the disclosure of which is hereby incorporated by reference and priority of which is hereby claimed pursuant to 37 C.F.R. 1.78(a).

FIELD OF THE INVENTION

The present invention relates to payment card data systems and methods.

BACKGROUND OF THE INVENTION

Various types of payment card data systems and methods are known.

SUMMARY OF THE INVENTION

The present invention seeks to provide a new electronic offer system. There is thus provided in accordance with a preferred embodiment of the present invention an electronic offer system including a payment instrument reader for reading payment instrument data from a payment instrument and an offer-payment instrument account association (O-PIAA) server communicating with the payment instrument reader and automatically operative in response to reading of the payment instrument data by the payment instrument reader to associate at least one offer in an offer program with a payment instrument account indicated by the payment instrument data.

Preferably, the payment instrument reader is selected from a card swipe reader, a smart card reader and a contactless reader. Additionally or alternatively, the O-PIAA server is operative to associate at least one offer, selected by a physical input provided by a holder of the payment instrument, with the payment instrument account of the holder.

In accordance with a preferred embodiment of the present invention the electronic offer system also includes an offer presentation and selection customer interface.

Preferably, the payment instrument reader forms part of a payment terminal.

In accordance with a preferred embodiment of the present invention the O-PIAA server is operative to associate at least one offer, selected by a physical input to the offer presentation and selection customer interface, with the payment instrument account of the holder. Additionally or alternatively, the offer presentation and selection customer interface forms part of a payment terminal.

In accordance with a preferred embodiment of the present invention the O-PIAA server also employs additional data relating to a holder of the payment instrument. Additionally, the additional data relating to a holder of the payment instrument includes a telephone number of the holder enabling redemption messages to be sent to the holder.

Preferably, the O-PIAA server is also operative in response to an input provided by a holder of the payment instrument to hook at least one offer, selected by a physical input to an offer presentation and selection customer interface, to a personal contact hook of the holder of the payment instrument. Additionally, the personal contact hook is selected from a telephone number, an email address, a social network identifier and a messaging identifier. Additionally or alternatively, the input provided by a holder of the payment instrument to hook at least one offer is received at the offer presentation and selection customer interface.

In accordance with a preferred embodiment of the present invention the electronic offer system also includes an offer content server cooperating with the offer presentation and selection customer interface for supplying offer content thereto.

In accordance with a preferred embodiment of the present invention the payment instrument reader is located within a vehicle and the O-PIAA server is located remotely from the payment instrument reader. Alternatively, the payment instrument reader is located within a retail store and the O-PIAA server is located remotely from the payment instrument reader.

In accordance with a preferred embodiment of the present invention the offer presentation and selection customer interface is located within a vehicle. Alternatively, the offer presentation and selection customer interface is located within a retail store.

Preferably, the O-PIAA server is operative to associate at least one offer in an offer program with a payment instrument account subsequent to hooking at least one offer, selected by a physical input to an offer presentation and selection customer interface, to a personal contact hook of the holder of the payment instrument.

In accordance with a preferred embodiment of the present invention the O-PIAA server is operative to associate at least one offer in an offer program with a payment instrument account generally coincidentally with use of the payment instrument reader for payment. Alternatively, the O-PIAA server is operative to associate at least one offer in an offer program with a payment instrument account independently of any possible use of the payment instrument reader for payment.

There is also provided in accordance with another preferred embodiment of the present invention an electronic offer method including presenting at least one offer to a potential customer, enabling the potential customer to select at least one of the at least one offer, enabling the potential customer to use a specific payment instrument for a purchase and responsive to use of the specific payment instrument for the purchase, automatically associating the at least one offer selected by the potential customer with the specific payment instrument, whereby upon presentation of the specific payment instrument the potential customer can redeem the at least one offer previously selected by the potential customer.

BRIEF DESCRIPTION OF THE DRAWINGS

The present invention will be understood and appreciated more fully from the following detailed description, taken in conjunction with the drawings in which:

FIGS. 2A/1, 2A/2 and 2A/3 are together a simplified flow diagram illustrating operation of one embodiment of the payment card data system of FIG. 1;

FIGS. 2B/1, 2B/2 and 2B/3 are together a simplified flow diagram illustrating operation of another embodiment of the payment card data system of FIG. 1;

FIGS. 2C/1, 2C/2 and 2C/3 are together a simplified flow diagram illustrating operation yet another embodiment of the payment card data system of FIG. 1;

FIGS. 2D/1 and 2D/2 are together a simplified flow diagram illustrating operation of a further embodiment of the payment card data system of FIG. 1;

FIGS. 2E/1 and 2E/2 are together a simplified flow diagram illustrating operation of a still further embodiment of the payment card data system of FIG. 1;

FIGS. 5A, 5B, 5C and 5D are simplified pictorial illustrations of the operation of another embodiment of the payment card data system of FIG. 1.

DETAILED DESCRIPTION OF PREFERRED EMBODIMENTS

Figure 1:
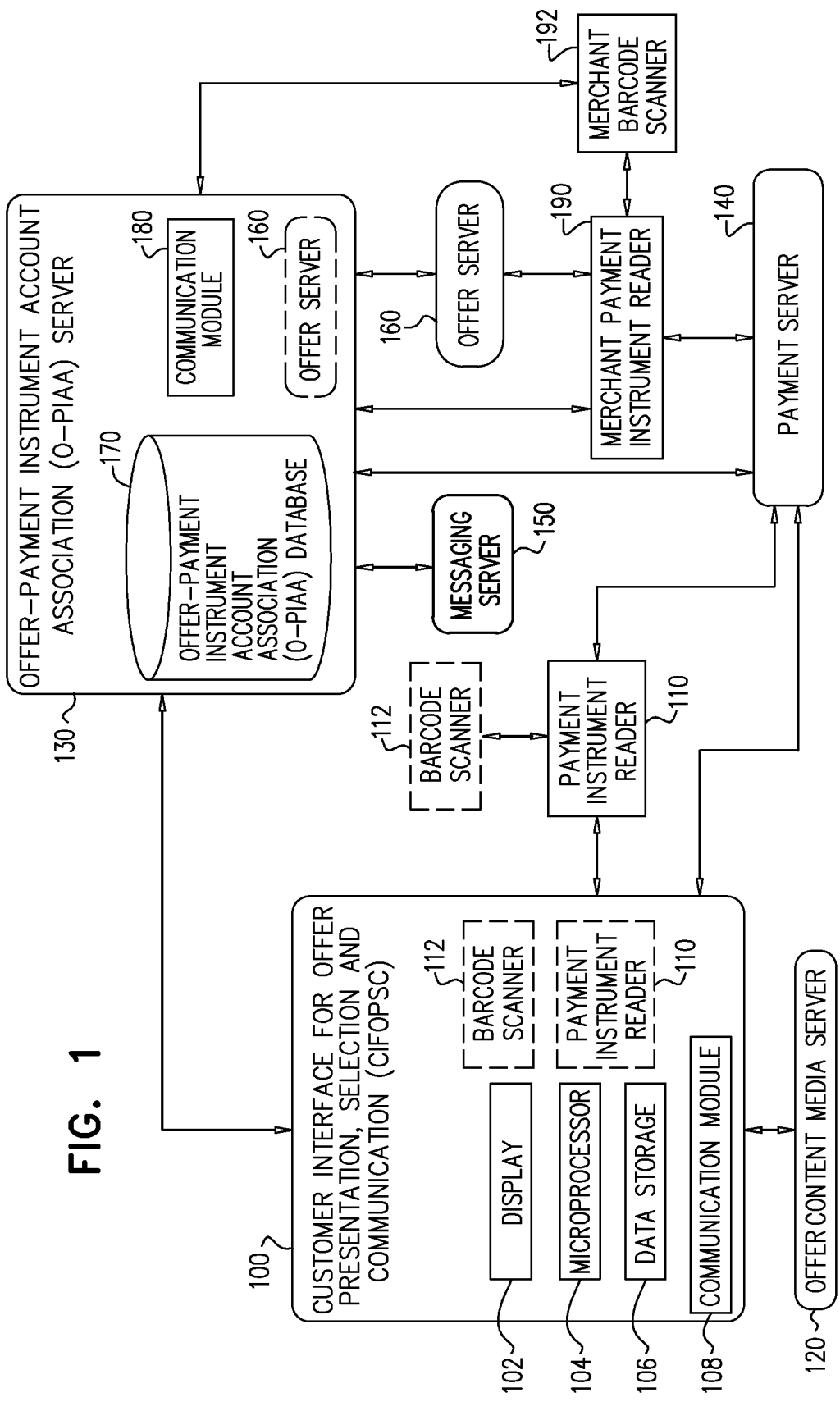
FIG. 1 is a simplified block diagram illustration of a payment card data system constructed and operative in accordance with a preferred embodiment of the present invention.

Reference is now made to FIG. 1, which is a simplified block diagram illustration of a payment card data system constructed and operative in accordance with a preferred embodiment of the present invention.

As seen in FIG. 1, there is provided a Customer Interface For Offer Presentation, Selection and Communication (CIFOPSC) 100, which preferably includes a display 102 and which presents at least one offer to a potential customer for that offer. For the sake of clarity, the term "potential customer" is used to denote a potential customer for an offer, whether or not the "potential customer" is actually currently a customer, such as a taxi rider. The offer may relate to purchase of one or more products or services and typically may be redeemed at a retail store or on-line. Alternatively or additionally, the offer may relate to a total purchase amount which may be limited, for example, to a given purchase transaction or cumulative purchases over a given time period. Other types of offers may also be presented by the CIFOPSC.

CIFOPSC 100 preferably also includes a microprocessor 104, data storage functionality 106, such as a database, and a communications module 108. Display 102 may be a touch screen. Alternatively, a keyboard may be provided. Functionality of voice communication with a potential customer may also or alternatively be provided. Functionality for wireless communication with a customer's mobile communicator, such as a smartphone, is preferably also provided.

A payment instrument reader 110, such as a payment card reader, preferably communicates with the CIFOPSC 100 and may be integrated therewith as shown in dashed lines in FIG. 1. A barcode scanner 112 optionally but preferably communicates with the CIFOPSC 100 and may be integrated therewith as shown in dashed lines in FIG. 1. The payment instrument reader 110 may have one or more, and preferably all, of card swipe functionality, smart card reading functionality and contactless payment instrument reading functionality. The payment instrument may be, for example, a credit card, a debit card, a loyalty card, a mobile communicator-based wallet or other mobile communicator-based payment functionality.

CIFOPSC 100 preferably receives, from an offer content media server 120, content to be presented to the potential customer in connection with the at least one offer. Typically, such content is image and/or video content, although it may additionally or alternatively include audio content. The offer content media server 120 may receive the content from one or more offer content providers.

CIFOPSC 100 preferably communicates with an Offer-Payment Instrument Account Association (O-PIAA) server 130, which associates an offer selected by a potential customer with a payment instrument held by, and preferably physically held by, the potential customer. Preferably, the association is with a Primary Account Number (PAN) of the payment instrument. Examples of a PAN are credit card numbers and debit card numbers. Also included within the definition of PAN for the purposes of this patent application are surrogate values such as a token, a Primary Account Reference (PAR) or an encrypted version of the PAN.

For the purposes of this patent application "association with a Primary Account Number (PAN)" is to be understood to encompass not only direct association with the PAN but also association with surrogate values such as a token, a Primary Account Reference (PAR) or an encrypted version of the PAN.

A payment server 140 of a payment card company, such as a credit card company, for example VISA® or MASTERCARD®, preferably receives the PAN, preferably in encrypted form, directly from the payment instrument reader 110 or alternatively via CIFOPSC 100 and/or O-PIAA server 130. An optional messaging server 150 preferably communicates messages, such as SMS messages, from the O-PIAA server 130 to a mobile communicator of the potential customer.

The O-PIAA server 130 may operate in various commercial contexts. It may be independent of and communicate with a corresponding offer server 160 of the payment card company. Alternatively it may be operated by the payment card company, such as VISA® or MASTERCARD®, or another entity and could be integrated with or obviate the offer server 160.

Accordingly, in FIG. 1, the offer server 160 is shown in solid lines when it is independent of and communicates with the O-PIAA server 130 and is shown in dashed lines, when it is integrated with or obviated by the O-PIAA server 130.

The O-PIAA server 130 preferably includes data storage functionality, such as an O-PIAA database 170 and a communications module 180.

The O-PIAA server 130 and/or the offer server 160 participates in redemption of an offer associated thereby with the PAN of the customer, previously referred to as the potential customer, by preferably communicating with a merchant payment instrument reader 190, such as a Point of Sale terminal, PIN Pad or cash register e.g. VERIFONE® VX850, VX690 or MX880, and a merchant barcode scanner 192 at a physical or on-line point of sale. The merchant payment instrument reader 190 also communicates directly or indirectly with the payment server 140 of the payment card company. Merchant barcode scanner 192 may also communicate directly or indirectly with the merchant payment instrument reader 190.

Reference is now made to FIGS. 2A/1-2A/3, which are together a simplified flow diagram illustrating operation of one embodiment of the payment card data system of FIG. 1. In FIGS. 2A/1-2A/3, various optional steps are presented and indicated in italics.

The embodiment described hereinbelow with reference to FIGS. 2A/1-2A/3 relates to a taxi environment and employs a payment instrument reader 110 which is located in a vehicle, such as a taxi. It is appreciated that the present invention is not limited to this embodiment and includes embodiments wherein the payment instrument reader may be in a fixed location or in another non-static location. The payment instrument reader may be stand-alone or may be connected to or form part of a point of sale device.

Reading of payment instrument data by the payment instrument reader 110 may be carried out using various different technologies, such as swiping a magnetic stripe bearing payment card, contact or contactless reading of a smart card or other chip enabled card, NFC or acoustic reading of a payment instrument. The payment instrument need not be in the form of a card but may be embodied in a mobile communication device, such as a mobile telephone.

In the embodiment referenced in FIGS. 2A/1-2A/3, initially as indicated by reference numeral 200, a potential customer enters a taxi and the taxi driver starts the taxi meter.

Figure 3A:
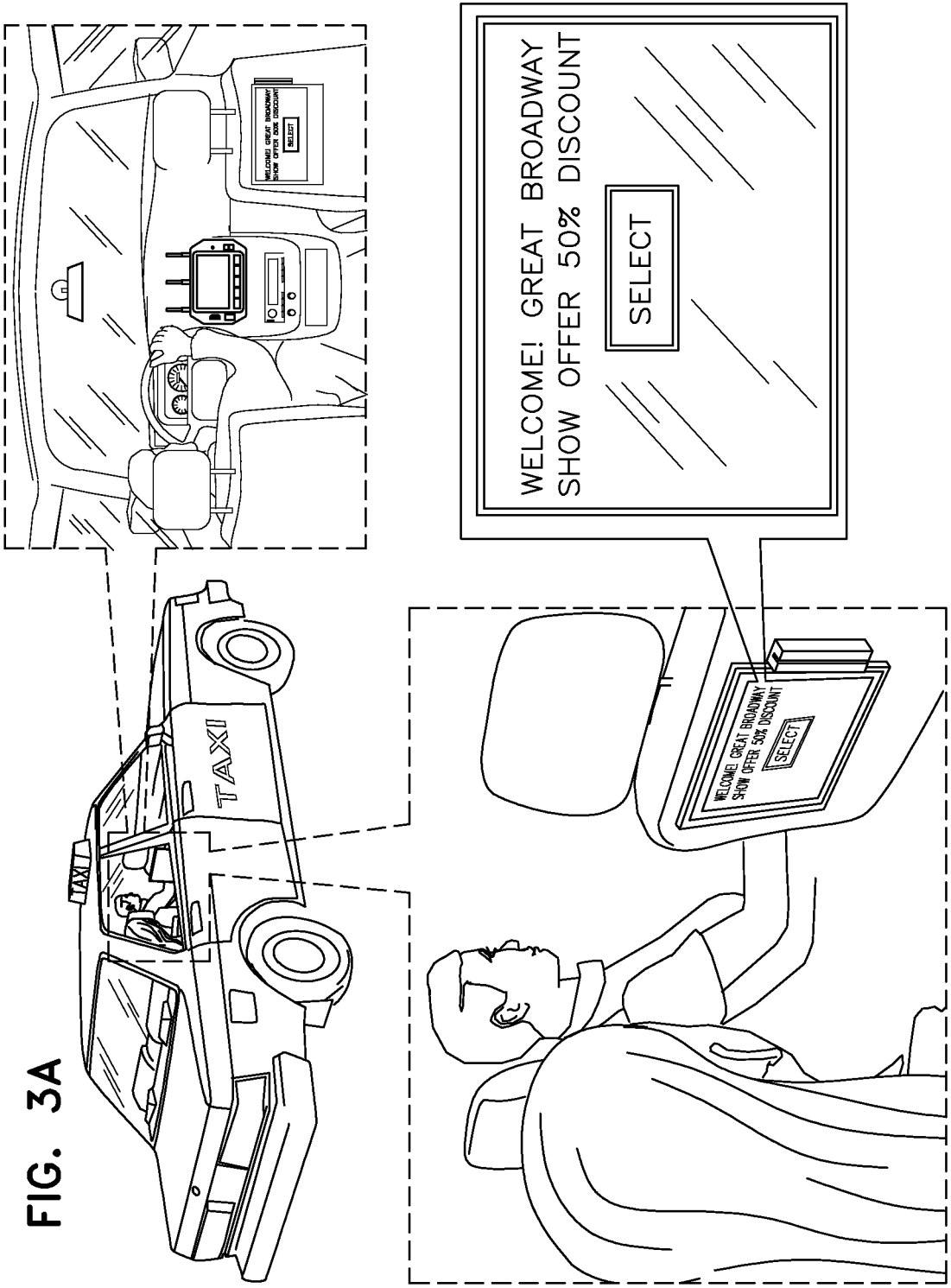
FIGS. 3A, 3B, 3C and 3D are simplified pictorial illustrations of the operation of an embodiment of the payment card data system of FIG. 1.

The Customer Interface For Offer Presentation, Selection and Communication (CIFOPSC) 100 and its associated display 102 (FIG. 1) preferably displays a welcome message and presents at least one offer to the potential customer, as indicated by reference numeral 202 and in FIG. 3A. Alternatively, a customer may initiate presentation of offers on display 102. Displays of given offers may be dependent on various factors, such as, for example, geolocation, time of day and customer preferences. One example is sometimes termed dayparting, which refers to a specific subset of hours within a given day or days. Another example is geotargeting, which refers to any one or more of current location, pickup location, drop off location and airport rate code status. CIFOPSC 100 preferably takes into account all relevant rules associated with a given offer or offers.

Figure 3B:
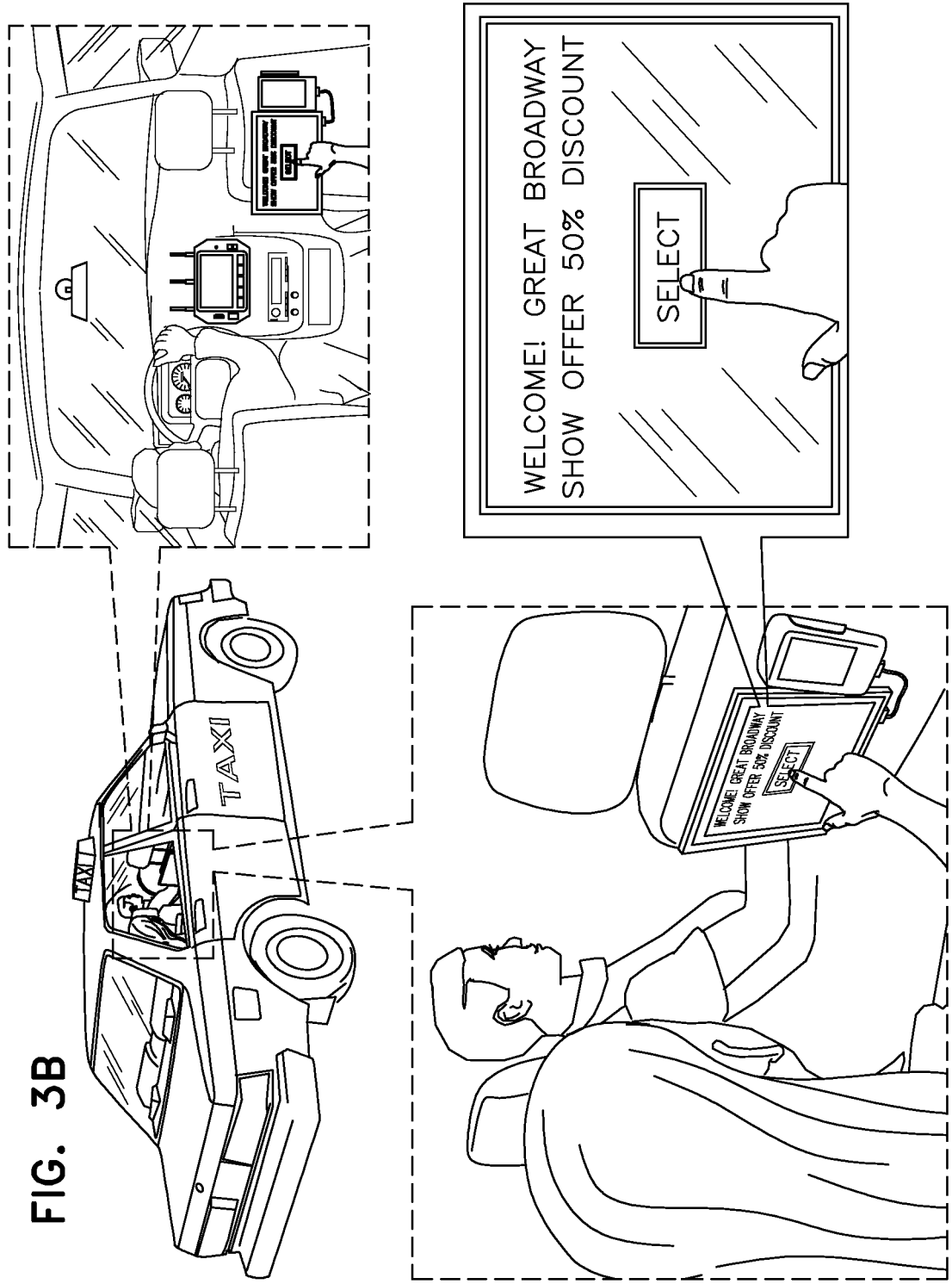

The potential customer may select at least one offer, hereinafter termed a Customer Selected Offer (CSO), as indicated by reference numeral 204 and in FIG. 3B.

Optionally, as indicated by reference numeral 206, the potential customer is prompted to enter via the CIFOPSC 100 a Personal Contact Hook (PCH), which may be, for example, a mobile phone number, an email address and a social network contact. CIFOPSC 100 checks the PCH format, e.g. the mobile phone format, and if it is not valid, an error message is displayed.

Optionally, as indicated by reference numeral 208, the potential customer is prompted to confirm acceptance of terms and conditions relating to the offer.

Optionally, as indicated by reference numeral 210, the optional potential customer-entered PCH and confirmation inputs are received by the O-PIAA server 130.

Optionally, as indicated by reference numeral 212, the O-PIAA server 130 checks the O-PIAA database 170 on the basis of the optional potential customer entered inputs to ascertain whether the potential customer is already enrolled in an offer program operated by the system of FIG. 1.

Optionally, as indicated by reference numeral 214, if the potential customer is already enrolled in a relevant offer program, the potential customer's profile stored in the O-PIAA database 170 may be accessed by the O-PIAA server 130 and if the potential customer is not already enrolled in the offer program, the potential customer may be enrolled at this stage. In such a case, a new customer PCH may be stored in the O-PIAA database 170.

Optionally, as indicated by reference numeral 216, the potential customer's at least one selected offer (CSO) may be hooked by the Customer Interface For Offer Presentation, Selection and Communication (CIFOPSC) 100, using the PCH data, with any other CSOs of the same potential customer stored in the O-PIAA database 170.

Optionally, as indicated by reference numeral 218, additional offers, which may be based on the potential customer profile stored in the O-PIAA database 170, may be presented to the potential customer.

Optionally, as indicated by reference numeral 220, if one or more additional offers are selected by the potential customer, the additional customer selected offer may be hooked by the Customer Interface For Offer Presentation, Selection and Communication (CIFOPSC) 100, using the PCH data, with any other CSOs of the same potential customer stored in the O-PIAA database 170.

Figure 3C:
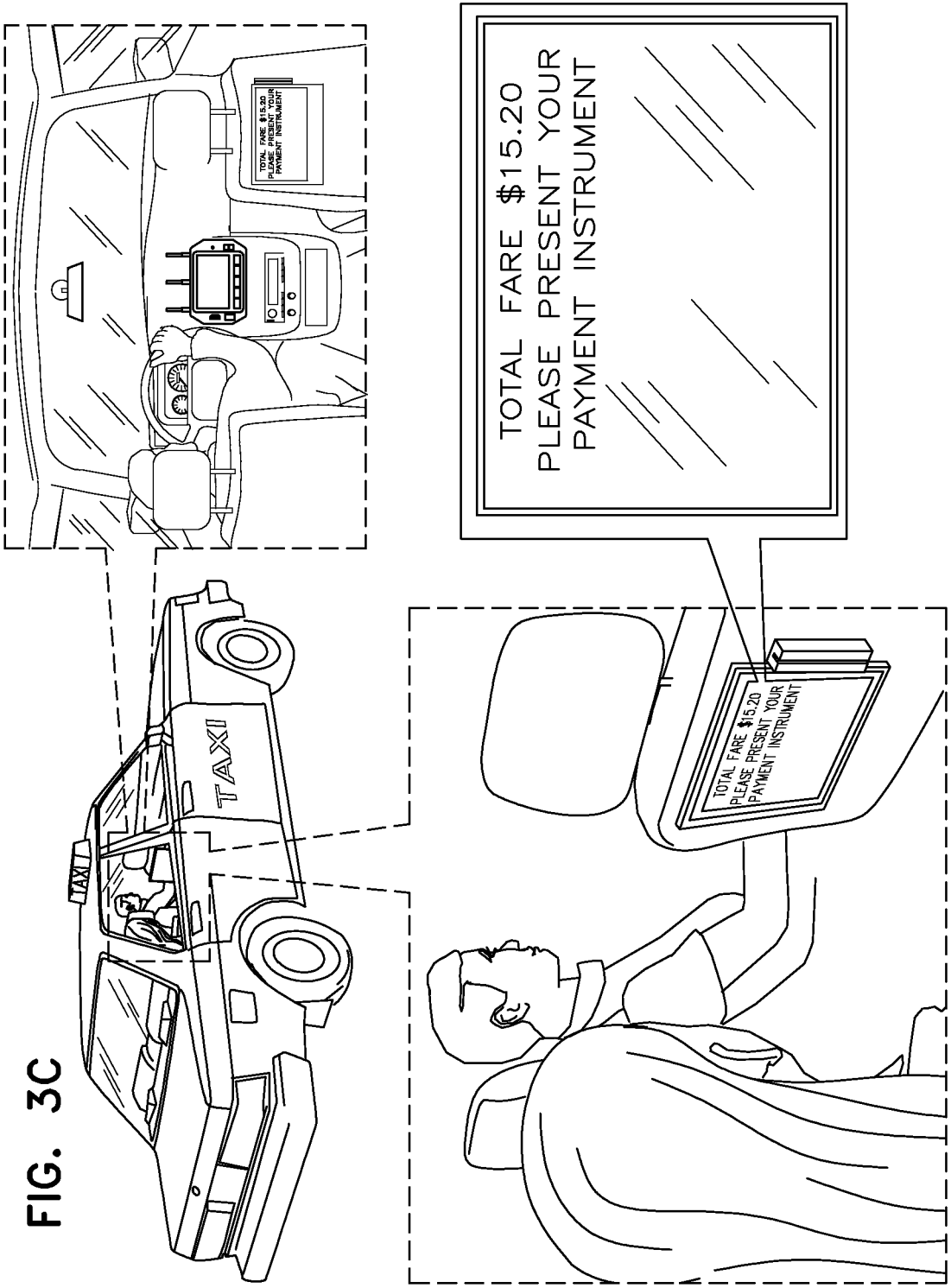

Upon reaching the taxi trip destination, the taxi driver stops the taxi meter, which results in the appearance of a prompt on CIFOPSC display 102 to the potential customer to present a payment instrument to the taxi payment instrument reader 110 associated with CIFOPSC 100, as indicated by reference number 222 and in FIG. 3C.

Figure 3D:
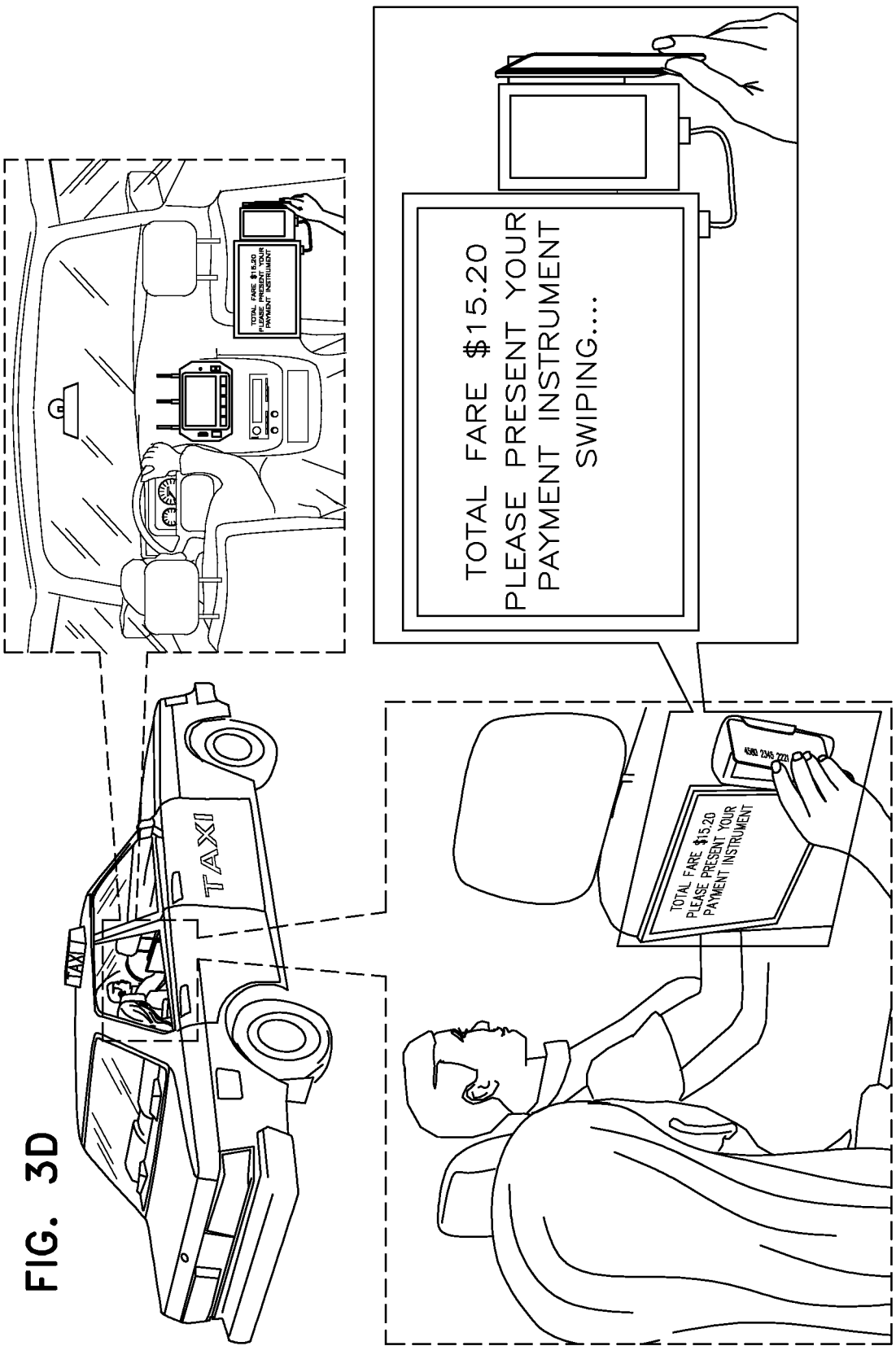

As indicated by reference numeral 224 and in FIG. 3D, a potential customer presented payment instrument is read by the taxi payment instrument reader 110 and validated for payment and/or use in the offer program.

As indicated by reference numeral 226, if the purchase is being paid for using the potential customer presented payment instrument, payment particulars read by the taxi payment instrument reader 110 are transmitted, preferably in encrypted form, to the payment server 140 of the payment card company for authorization and settlement.

As indicated by reference numeral 228, the Customer Interface For Offer Presentation, Selection and Communication (CIFOPSC) 100 sends the specific PAN read by the taxi payment instrument reader 110, preferably in encrypted form, or via a token or other secure medium, to the O-PIAA server 130, which may also receive details of one or more CSOs associated with the same PAN from the O-PIAA database 170.

As indicated by reference numeral 230, the O-PIAA server 130 stores the specific PAN in encrypted form and, as indicated by reference numeral 232, associates the one or more CSOs with the specific PAN.

Optionally, as indicated by reference numeral 234, the O-PIAA server 130 communicates the specific PAN, preferably in encrypted form, and information associating the specific PAN with one or more CSOs to the payment card company offer server 160.

Optionally, as indicated by reference numeral 236, the O-PIAA server 130 communicates a message, such as an SMS message, via messaging server 150, such as a messaging server operated by one of a number of commercial message service suppliers, to the potential customer confirming association of one or more CSOs with the specific PAN.

When the potential customer, now termed "the customer" wishes to redeem one of the CSOs, the customer presents to a merchant payment instrument reader 190 a payment instrument held by the customer and having the specific PAN earlier associated with one or more CSOs for payment authorization and settlement, as indicated by reference numeral 238.

The merchant payment instrument reader 190 transmits the specific PAN to the payment server 140 of the payment card company, preferably in encrypted form, for payment authorization, as indicated by reference numeral 240.

The merchant payment instrument reader 190 transmits to the offer server 160 and/or the O-PIAA server 130 the specific PAN, preferably in encrypted form, and data relating to at least one purchase by the customer, preferably received directly or indirectly from merchant barcode scanner 192, as indicated by reference numeral 242.

In one example, the merchant payment instrument reader 190 transmits the specific PAN to the offer server 160 in encrypted form. The offer server 160 decrypts the specific PAN and then re-encrypts it and transmits it to the O-PIAA server 130.

In another example, the merchant payment instrument reader 190 transmits the specific PAN to the O-PIAA server 130 in encrypted form. The O-PIAA server 130 decrypts the specific PAN and then re-encrypts it and transmits it to the offer server 160.

In yet another example, the merchant payment instrument reader 190 transmits the specific PAN to the O-PIAA server 130 in encrypted form.

The purchase may be a product or a service or a combination thereof, and the presentation may be, for example, in person or on-line.

The offer server 160 and or the O-PIAA server 130 ascertains whether at least one purchase by the customer is covered by at least one valid CSO, as indicated by reference numeral 244.

If the purchase is, or cumulative purchases are covered by at least one valid CSO, the O-PIAA server 130 confirms redemption of the CSO and the customer is credited accordingly, as indicated by reference numeral 246. The crediting may take place either at the time of the transaction, and be reflected in a transaction invoice or receipt, or thereafter. The crediting may be confirmed, for example, by an SMS message, via messaging server 150, such as a messaging server operated by one of a number of commercial message service suppliers, to the customer. For example, the credit may appear on a payment card statement issued by the payment card company.

Reference is now made to FIGS. 2B/1-2B/3, which together are a simplified flow diagram illustrating operation of another embodiment of the payment card data system of FIG. 1. In FIGS. 2B/1-2B/3, various optional steps are presented and indicated in italics.

The embodiment described hereinbelow with reference to FIGS. 2B/1-2B/3 relates to a typically non-attended environment, such as a supermarket self check-out, a vending machine or a kiosk. This embodiment is also applicable to other static environments, such as an attended environment, such as a retail store and employs a payment instrument reader 110 which is typically located in a retail establishment. The payment instrument reader may be stand-alone or may be connected to or form part of a point of sale device, a cash register or a vending machine.

Reading of payment instrument data by the payment instrument reader 110 may be carried out using various different technologies, such as swiping a magnetic stripe bearing payment card, contact or contactless reading of a smart card or other chip enabled card, NFC or acoustic reading of a payment instrument. The payment instrument need not be in the form of a card but may be embodied in a mobile communication device, such as a mobile telephone.

In the embodiment illustrated in FIGS. 2B/1-2B/3, initially as indicated by reference numeral 300, a potential customer enters a store, or approaches a kiosk or vending machine in a park or other static location.

Figure 4A:
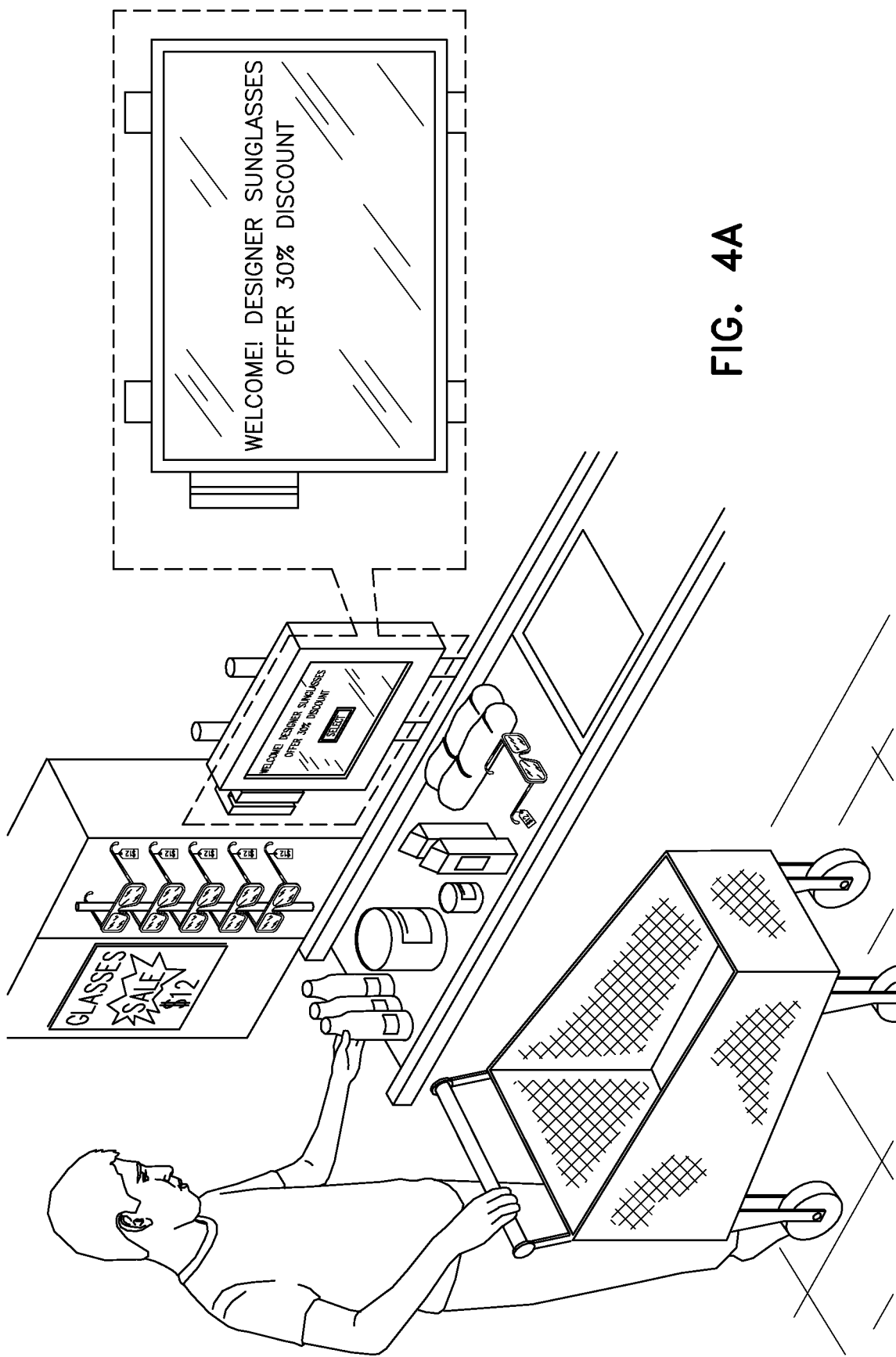
FIGS. 4A, 4B, 4C and 4D are simplified pictorial illustrations of the operation of another embodiment of the payment card data system of Fig.

A Customer Interface For Offer Presentation, Selection and Communication (CIFOPSC) 100 and its associated display 102 (FIG. 1), which may be associated with a check-out display, a kiosk, or a vending machine, preferably displays a welcome message and presents at least one offer to the potential customer, which offer may be based, inter alia, on an item purchased by the potential customer as indicated by barcode scanner 112 or an equivalent purchase data output device, as indicated by reference numeral 302 and in FIG. 4A.

Displays of given offers may be dependent on various factors, such as, for example, geolocation and time of day and an item or items that are purchased. One example is sometimes termed dayparting, which refers to a specific subset of hours within a given day or days. Another example is geotargeting, which refers to the CIFOPSC current location. CIFOPSC 100 preferably takes into account all relevant rules associated with a given offer or offers. A further example is providing a future discount offer on a product being purchased.

Figure 4B:
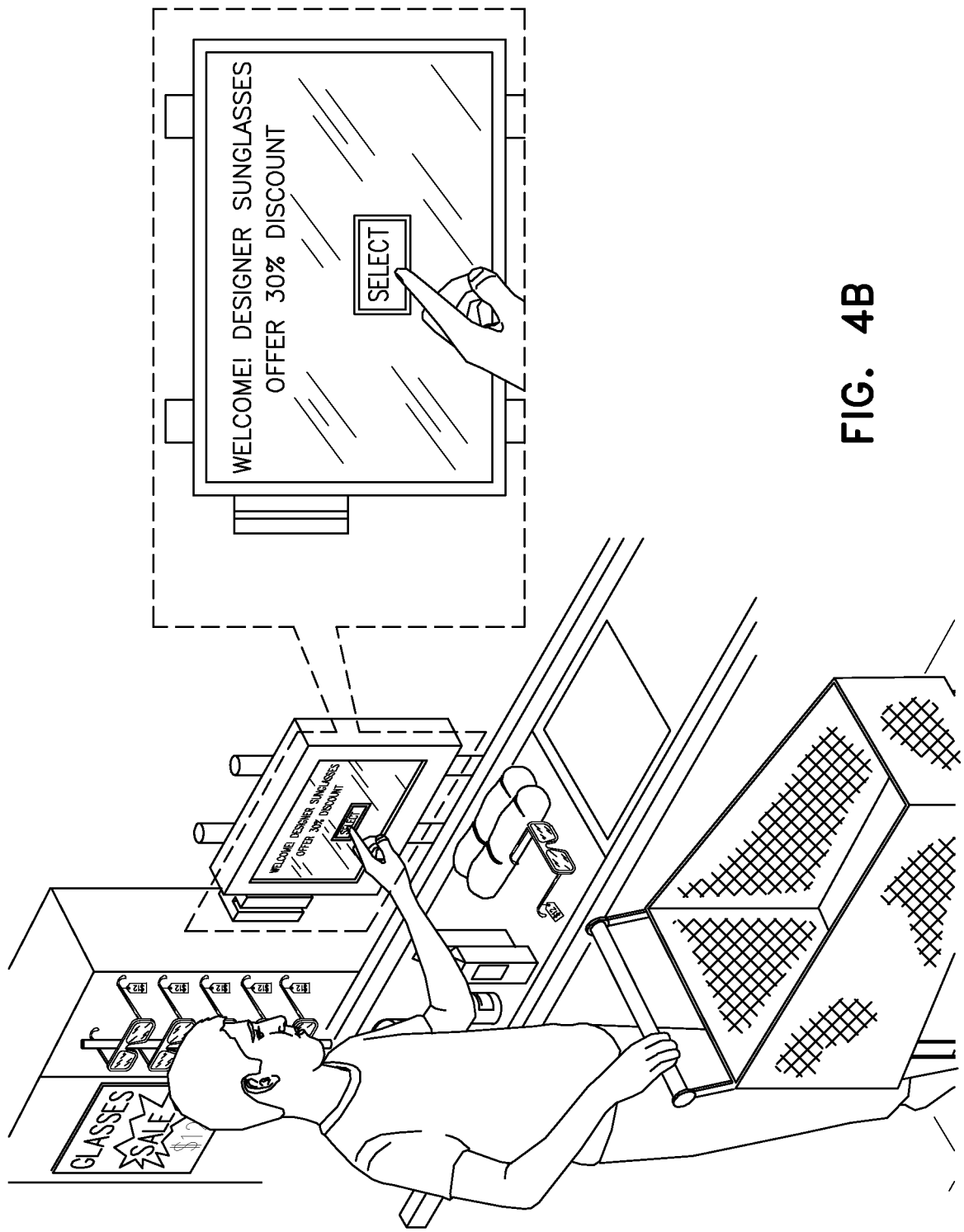

The potential customer may select at least one offer, hereinafter termed a Customer Selected Offer (CSO), as indicated by reference numeral 304 and in FIG. 4B.

Optionally, as indicated by reference numeral 306, the potential customer is prompted to enter, via the CIFOPSC 100, a Personal Contact Hook (PCH), which may be, for example, a mobile phone number, an email address and a social network contact. CIFOPSC 100 checks the PCH format, e.g. the mobile phone format, and if it is not valid, an error message is displayed.

Optionally, as indicated by reference numeral 308, the potential customer is prompted to confirm acceptance of terms and conditions relating to the offer.

Optionally, as indicated by reference numeral 310, the optional potential customer-entered PCH and confirmation inputs are received by the O-PIAA server 130.

Optionally, as indicated by reference numeral 312, the O-PIAA server 130 checks the O-PIAA database 170 on the basis of the optional potential customer entered inputs to ascertain whether the potential customer is already enrolled in an offer program operated by the system of FIG. 1.

Optionally, as indicated by reference numeral 314, if the potential customer is already enrolled in the offer program, the potential customer's profile stored in the O-PIAA database 170 is accessed by the O-PIAA server 130 and if the potential customer is not already enrolled in the offer program, the potential customer is enrolled at this stage, i.e. a new customer PCH is stored in the O-PIAA database 170.

Optionally, as indicated by reference numeral 316, the potential customer's at least one selected offer (CSO) is hooked by the Customer Interface For Offer Presentation, Selection and Communication (CIFOPSC) 100 using the PCH data with any other CSOs of the same potential customer stored in the O-PIAA database 170.

Optionally, as indicated by reference numeral 318, additional offers, which may be based on the potential customer profile stored in the O-PIAA database 170 are presented to the potential customer. At a self checkout, or at a kiosk or at a vending machine additional offers may be presented. At a cashier attended checkout, typically only one offer is presented. The number, timing and presentation of additional offers may depend on various factors, such as, for example, a number of shoppers waiting in line and what products are purchased. For example, additional offers may be presented until the potential customer indicates a wish that no further offers be displayed or after a pre-determined number of offers have been presented. Such additional offers may include, for example future discount offers for products identical to or related to purchased products.

Optionally, as indicated by reference numeral 320, if one or more additional offers are selected by the potential customer, the additional customer selected offer is hooked by the Customer Interface For Offer Presentation, Selection and Communication (CIFOPSC) 100 using the PCH data with any other CSOs of the same potential customer stored in the O-PIAA database 170.

Figure 4C:
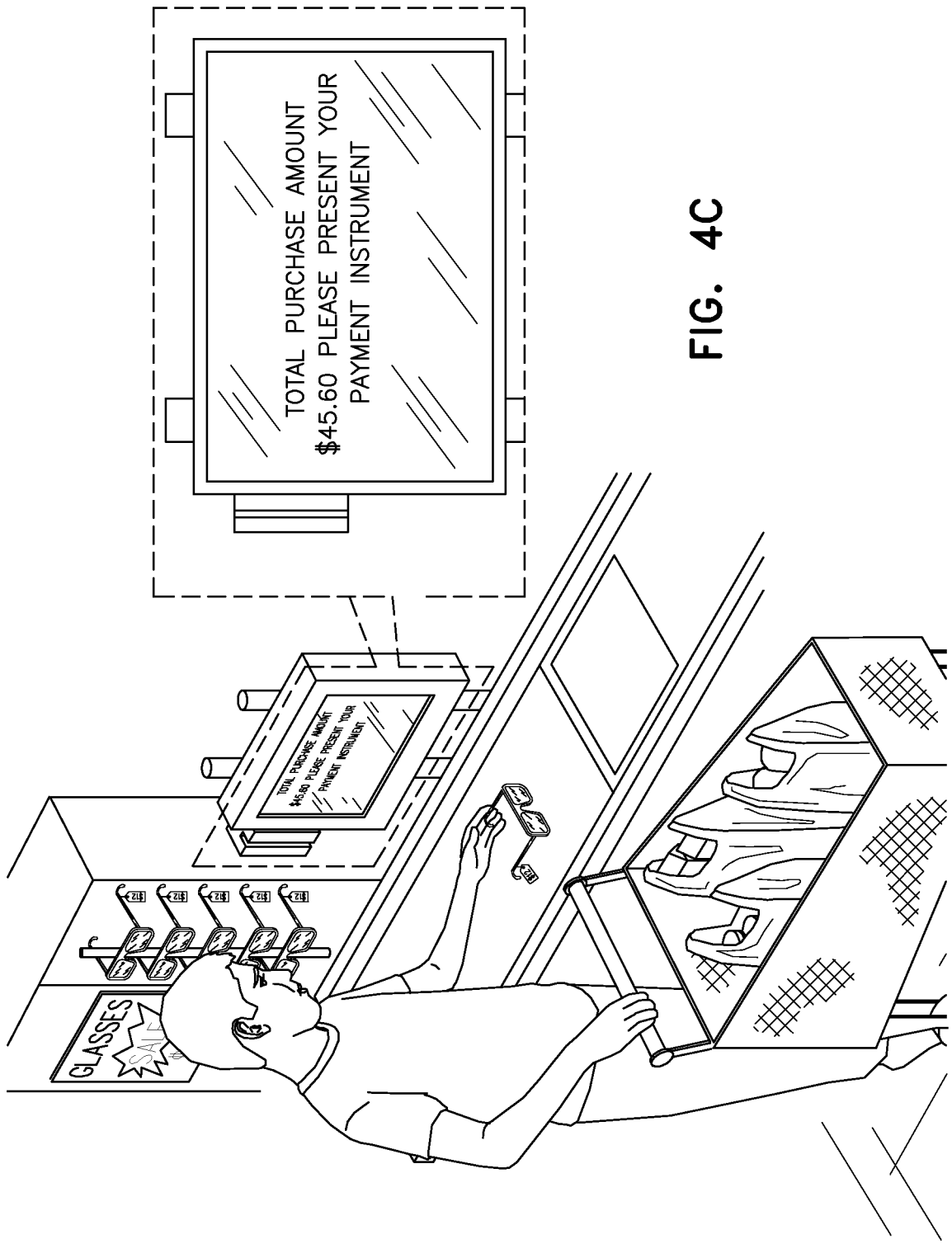

At an appropriate time, a prompt appears on CIFOPSC display 102 requesting the potential customer to present a payment instrument to the payment instrument reader 110 associated with CIFOPSC 100, as indicated by reference number 322 and in FIG. 4C.

Figure 4D:
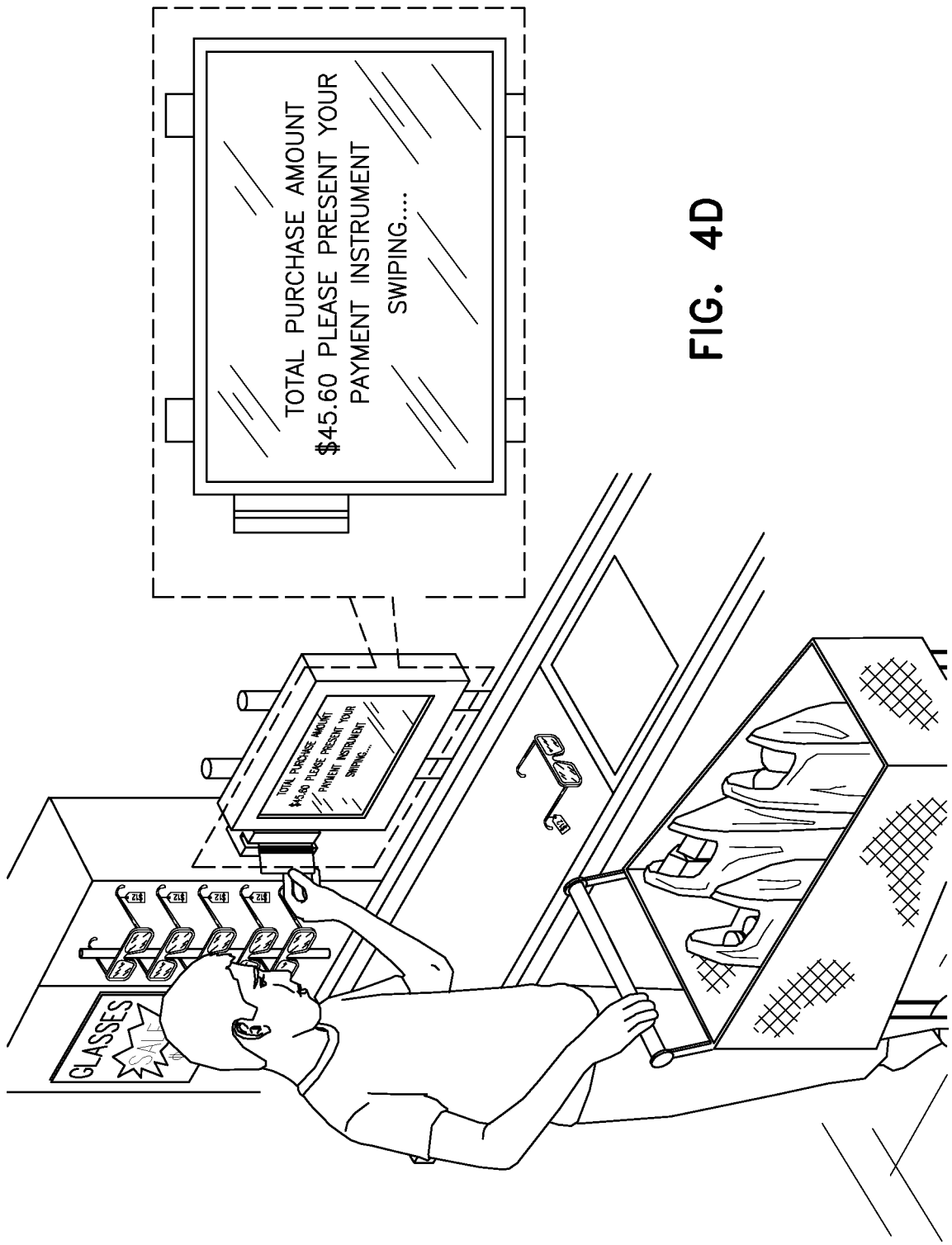

As indicated by reference numeral 324 and in FIG. 4D, a potential customer presented payment instrument is read by the payment instrument reader 110 and validated for payment and/or use in the offer program.

As indicated by reference numeral 326, if the purchase is being paid with the potential customer presented payment instrument, payment particulars read by the payment instrument reader 110 and purchase particulars read by barcode scanner 112 or an equivalent purchase data output device are transmitted, preferably in encrypted form, to the payment server 140 of the payment card company for authorization and settlement.

As indicated by reference numeral 328, the Customer Interface For Offer Presentation, Selection and Communication (CIFOPSC) 100 sends the specific PAN read by the payment instrument reader 110, preferably in encrypted form, or via a token or other secure medium, to the O-PIAA server 130, which also may receive details of one or more CSOs associated with the same PAN from the O-PIAA database 170.

As indicated by reference numeral 330, the O-PIAA server 130 stores the specific PAN in encrypted form and, as indicated by reference numeral 332, associates the one or more CSOs with the specific PAN.

Optionally, as indicated by reference numeral 334, the O-PIAA server 130 communicates the specific PAN, preferably in encrypted form, and information associating the specific PAN with one or more CSOs to the payment card company offer server 160.

Optionally, as indicated by reference numeral 336, the O-PIAA server 130 communicates a message, such as an SMS message, via messaging server 150, such as a messaging server operated by one of a number of commercial message service suppliers, to the potential customer confirming association of one or more CSOs with the specific PAN.

When the potential customer, now termed "the customer" wishes to redeem one of the CSOs, the customer presents to a merchant payment instrument reader 190 the payment instrument held by the customer and having the specific PAN, previously associated with one or more CSOs, for payment authorization and settlement, as indicated by reference numeral 338.

The merchant payment instrument reader 190 transmits the specific PAN to the payment server 140 of the payment card company, preferably in encrypted form, for payment authorization, as indicated by reference numeral 340.

The merchant payment instrument reader 190 transmits to the offer server 160 and/or the O-PIAA server 130 the specific PAN, preferably in encrypted form, and data relating to at least one purchase by the customer, preferably received from merchant barcode scanner 192, as indicated by reference numeral 342.

In one example, the merchant payment instrument reader 190 transmits the specific PAN to the offer server 160 in encrypted form. The offer server 160 decrypts the specific PAN and then reencrypts it and transmits it to the O-PIAA server 130.

In another example, the merchant payment instrument reader 190 transmits the specific PAN to the O-PIAA server 130 in encrypted form. The O-PIAA server 130 decrypts the specific PAN and then reencrypts it and transmits it to the offer server 160.

In yet another example, the merchant payment instrument reader 190 transmits the specific PAN to the O-PIAA server 130 in encrypted form.

The purchase may be a product or a service or a combination thereof, and the presentation may be, for example, in person or on-line.

The offer server 160 and/or the O-PIAA server 130 ascertains whether at least one purchase by the customer is covered by at least one valid CSO, as indicated by reference numeral 344.

If the purchase is, or cumulative purchases are covered by at least one valid CSO, the offer server 160 and/or the O-PIAA server 130 confirms redemption of the CSO and the customer is credited accordingly, as indicated by reference numeral 346. The crediting may take place either at the time of the transaction, and be reflected in a transaction invoice or receipt, or thereafter. The crediting may be confirmed, for example, by an SMS message, via messaging server 150, such as a messaging server operated by one of a number of commercial message service suppliers, to the customer. For example, the credit may appear on a payment card statement issued by the payment card company.

Reference is now made to FIGS. 2C/1-2C/3, which together are a simplified flow diagram illustrating operation of one embodiment of the payment card data system of FIG. 1. In FIGS. 2C/1-2C/3, various optional steps are presented and indicated in italics.

The embodiment described hereinbelow with reference to FIGS. 2C/1-2C/3 relates to an airplane environment and employs a payment instrument reader 110 which is typically located in front of the passenger or incorporated in a personal entertainment system control unit. The payment card data system may be integrated with existing airplane cabin entertainment and sales system and may employ existing wireless communication links both within the airplane and between the airplane and remote servers, such as content servers and payment servers.

Reading of payment instrument data by the payment instrument reader 110 may be carried out using various different technologies, such as swiping a magnetic stripe bearing payment card, contact or contactless reading of a smart card or other chip enabled card, NFC or acoustic reading of a payment instrument. The payment instrument need not be in the form of a card but may be embodied in a mobile communication device, such as a mobile telephone.

In the embodiment illustrated in FIGS. 2C/1-2C/3, initially as indicated by reference numeral 400, a Customer Interface For Offer Presentation, Selection and Communication (CIFOPSC) 100 and an associated display 102 are provided for each passenger, preferably as part of or associated with a personal entertainment system. The process hereinbelow begins once a personal passenger interface display begins to operate.

The Customer Interface For Offer Presentation, Selection and Communication (CIFOPSC) 100 and its associated display 102 preferably displays a welcome message and presents at least one offer to the potential customer, as indicated by reference numeral 402 and in FIG. 5A. Displays of given offers may be dependent on various factors, such as, for example, trip destination, date and time of day and one or more purchased item. One example could be a future discount on a movie subscription which is offered to a person who had earlier viewed a pay for view movie on the airplane. CIFOPSC 100 preferably takes into account all relevant rules associated with a given offer or offers.

The potential customer may select at least one offer, hereinafter termed a Customer Selected Offer (CSO), as indicated by reference numeral 404 and in FIG. 5B.

Optionally, as indicated by reference numeral 406, the potential customer is prompted to enter, via the CIFOPSC 100, a Personal Contact Hook (PCH), which may be, for example, a mobile phone number, an email address and a social network contact. CIFOPSC 100 checks the PCH format, e.g. the mobile phone format, and if it is not valid, an error message is displayed.

Optionally, as indicated by reference numeral 408, the potential customer is prompted to confirm acceptance of terms and conditions relating to the offer.

Optionally, as indicated by reference numeral 410, the optional potential customer-entered PCH and confirmation inputs are received by the O-PIAA server 130.

Optionally, as indicated by reference numeral 412, the O-PIAA server 130 checks the O-PIAA database 170 on the basis of the optional potential customer entered inputs to ascertain whether the potential customer is already enrolled in an offer program operated by the system of FIG. 1.

Optionally, as indicated by reference numeral 414, if the potential customer is already enrolled in the offer program, the potential customer's profile stored in the O-PIAA database 170 is accessed by the O-PIAA server 130 and if the potential customer is not already enrolled in the offer program, the potential customer is enrolled at this stage, i.e. a new customer PCH is stored in the O-PIAA database 170.

Optionally, as indicated by reference numeral 416, the potential customer's at least one selected offer (CSO) is hooked by the Customer Interface For Offer Presentation, Selection and Communication (CIFOPSC) 100 using the PCH data with any other CSOs of the same potential customer stored in the O-PIAA database 170.

Optionally, as indicated by reference numeral 418, additional offers, which may be based on the potential customer profile stored in the O-PIAA database 170 are presented to the potential customer.

Optionally, as indicated by reference numeral 420, if one or more additional offers are selected by the potential customer, the additional customer selected offer is hooked by the Customer Interface For Offer Presentation, Selection and Communication (CIFOPSC) 100 using the PCH data with any other CSOs of the same potential customer stored in the O-PIAA database 170.

At an appropriate time, typically sufficiently before the personal entertainment system is shut down, a prompt appears on CIFOPSC display 102 to the potential customer to present a payment instrument to the payment instrument reader 110 associated with CIFOPSC 100, as indicated by reference number 422 and in FIG. 5C.

Figure 5D:
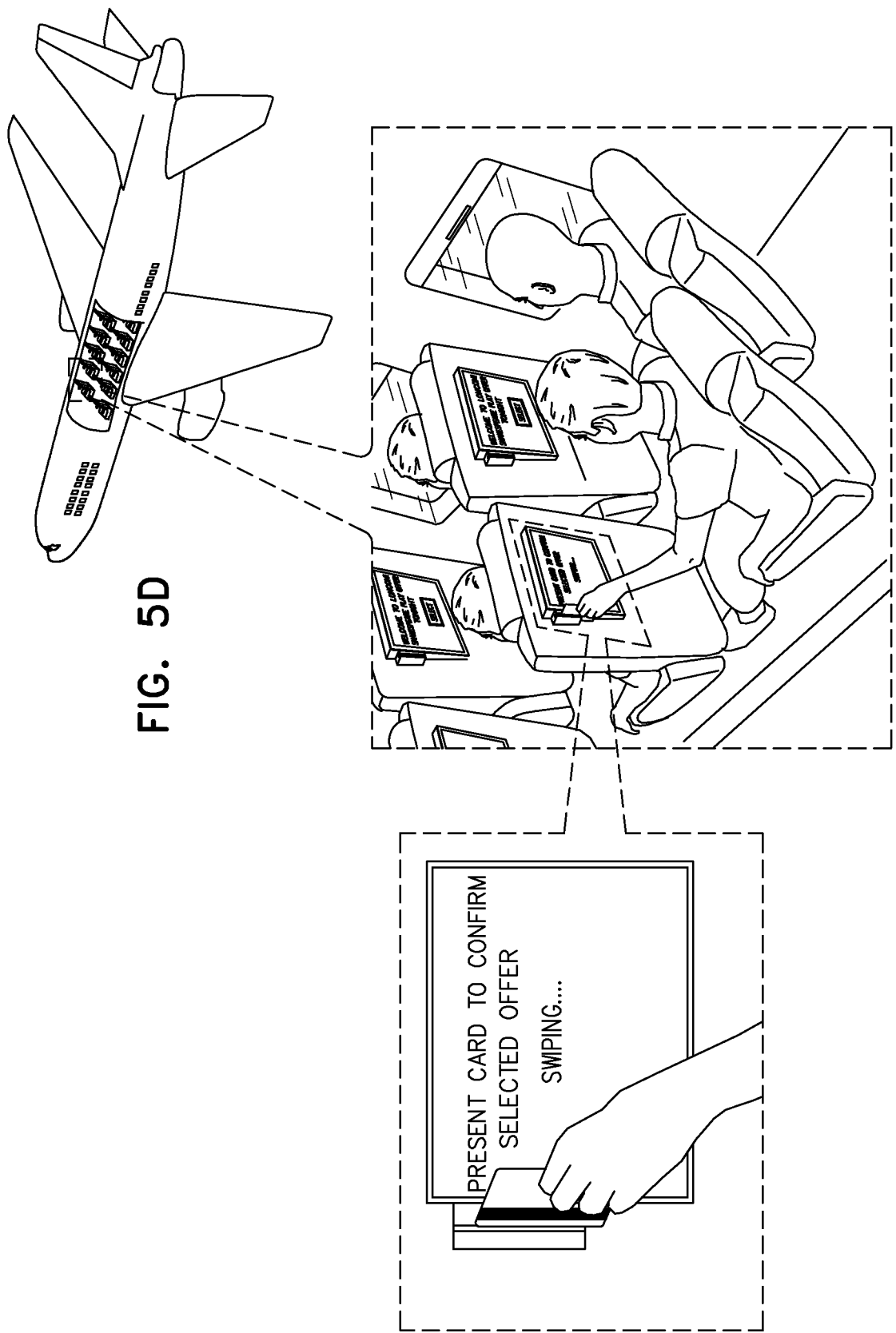

As indicated by reference numeral 424 and in FIG. 5D, a potential customer presented payment instrument is read by the payment instrument reader 110 and validated for use in the offer program.

As indicated by reference numeral 428, the Customer Interface For Offer Presentation, Selection and Communication (CIFOPSC) 100 sends the specific PAN read by the payment instrument reader 110, preferably in encrypted form, or via a token or other secure medium, to the O-PIAA server 130, which also may receive details of one or more CSOs associated with the same PAN from the O-PIAA database 170.

As indicated by reference numeral 430, the O-PIAA server 130 stores the specific PAN in encrypted form and, as indicated by reference numeral 432, associates the one or more CSOs with the specific PAN.

Optionally, as indicated by reference numeral 434, the O-PIAA server 130 communicates the specific PAN, preferably in encrypted form, and information associating the specific PAN with one or more CSOs to the payment card company offer server 160.

Optionally, as indicated by reference numeral 436, the O-PIAA server 130 communicates a message, such as an SMS message, via messaging server 150, such as a messaging server operated by one of a number of commercial message service suppliers, to the potential customer confirming association of one or more CSOs with the specific PAN.

When the potential customer, now termed "the customer" wishes to redeem one of the CSOs, the customer presents to a merchant payment instrument reader 190 the payment instrument held by the customer and having the specific PAN, previously associated with one or more CSOs, for payment authorization and settlement, as indicated by reference numeral 438.

The merchant payment instrument reader 190 transmits the specific PAN to the payment server 140 of the payment card company, preferably in encrypted form, for payment authorization, as indicated by reference numeral 440.

The merchant payment instrument reader 190 transmits to the offer server 160 and/or the O-PIAA server 130 the specific PAN, preferably in encrypted form, and data relating to at least one purchase by the customer, preferably received directly or indirectly from merchant barcode scanner 192, as indicated by reference numeral 442.

In one example, the merchant payment instrument reader 190 transmits the specific PAN to the offer server 160 in encrypted form. The offer server 160 decrypts the specific PAN and then reencrypts it and transmits it to the O-PIAA server 130.

In another example, the merchant payment instrument reader 190 transmits the specific PAN to the O-PIAA server 130 in encrypted form. The O-PIAA server 130 decrypts the specific PAN and then reencrypts it and transmits it to the offer server 160.

In yet another example, the merchant payment instrument reader 190 transmits the specific PAN to the O-PIAA server 130 in encrypted form.

The purchase may be a product or a service or a combination thereof, and the presentation may be, for example, in person or on-line.

The offer server 160 and/or the O-PIAA server 130 ascertains whether at least one purchase by the customer is covered by at least one valid CSO, as indicated by reference numeral 444.

If the purchase is, or cumulative purchases are, covered by at least one valid CSO, the offer server 160 and/or the O-PIAA server 130 confirms redemption of the CSO and the customer is credited accordingly, as indicated by reference numeral 446. The crediting may take place either at the time of the transaction, and be reflected in a transaction invoice or receipt, or thereafter. The crediting may be confirmed, for example, by an SMS message, via messaging server 150, such as a messaging server operated by one of a number of commercial message service suppliers, to the customer. For example, the credit may appear on a payment card statement issued by the payment card company.

Reference is now made to FIGS. 2D/1 & 2D/2, which are together a simplified flow diagram illustrating operation of yet another embodiment of the payment card data system of FIG. 1. In FIGS. 2D/1 & 2D/2, various optional steps are presented and indicated in italics.

The embodiment described hereinbelow with reference to FIGS. 2D/1 & 2D/2 relates to a typically non-attended environment, such as a supermarket self check-out, a vending machine or a kiosk. This embodiment is also applicable to other static environments, such as an attended environment, such as a retail store, and employs a payment instrument reader 110 which is typically located in a retail establishment. The payment instrument reader may be stand-alone or may be connected to or form part of a point of sale device, a cash register or a vending machine.

Reading of payment instrument data by the payment instrument reader 110 may be carried out using various different technologies, such as swiping a magnetic stripe bearing payment card, contact or contactless reading of a smart card or other chip enabled card, NFC or acoustic reading of a payment instrument. The payment instrument need not be in the form of a card but may be embodied in a mobile communication device, such as a mobile telephone.

In the embodiment illustrated in FIGS. 2D/1 & 2D/2, initially as indicated by reference numeral 500, a potential customer enters a store, or approaches a kiosk or vending machine in a park or other static location.

A Customer Interface For Offer Presentation, Selection and Communication (CIFOPSC) 100 and its associated display 102 (FIG. 1), which may be associated with a check-out display, a kiosk, or a vending machine, preferably displays a welcome message and presents at least one offer to the potential customer, which offer may be based on an item purchased, data regarding such item being received from barcode scanner 112 or equivalent purchased product output functionality, as indicated by reference numeral 502.

Displays of given offers may be dependent on various factors, such as, for example, geolocation and time of day. One example is sometimes termed dayparting, which refers to a specific subset of hours within a given day or days. Another example is geotargeting, which refers to the CIFOPSC current location. CIFOPSC 100 preferably takes into account all relevant rules associated with a given offer or offers.

The potential customer may select at least one offer, hereinafter termed a Customer Selected Offer (CSO), as indicated by reference numeral 504.

At an appropriate time, a prompt appears on CIFOPSC display 102 requesting the potential customer to present a payment instrument to the payment instrument reader 110 associated with CIFOPSC 100, as indicated by reference number 506.

As indicated by reference numeral 508, a potential customer presented payment instrument is read by the payment instrument reader 110 and validated for payment and/or use in the offer program.

As indicated by reference numeral 510, payment particulars read by the payment instrument reader 110 and purchase item data read by barcode scanner 112 are transmitted, preferably in encrypted form, to the payment server 140 of the payment card company for authorization and settlement.

As indicated by reference numeral 512, the Customer Interface For Offer Presentation, Selection and Communication (CIFOPSC) 100 sends the specific PAN read by the payment instrument reader 110, preferably in encrypted form, to the O-PIAA server 130, which also received details of one or more CSOs associated with the same PAN from the O-PIAA database 170.

As indicated by reference numeral 514, the O-PIAA server 130 stores the specific PAN in encrypted form and, as indicated by reference numeral 516, associates the one or more CSOs with the specific PAN.

Optionally, as indicated by reference numeral 518, the O-PIAA server 130 communicates the specific PAN, preferably in encrypted form, and information associating the specific PAN with one or more CSOs to the payment card company offer server 160.

Optionally, as indicated by reference numeral 520, the O-PIAA server 130 communicates a message, such as an SMS message, via messaging server 150, such as a messaging server operated by one of a number of commercial message service suppliers, to the potential customer confirming association of one or more CSOs with the specific PAN. Alternatively, the potential customer may ascertain which offers are associated with his/her payment instrument by accessing a website, such as that of the credit card company.

When the potential customer, now termed "the customer" wishes to redeem one of the CSOs, the customer presents to a merchant payment instrument reader 190 the payment instrument held by the customer and having the specific PAN, previously associated with one or more CSOs, for payment authorization and settlement, as indicated by reference numeral 522.

The merchant payment instrument reader 190 transmits the specific PAN to the payment server 140 of the payment card company, preferably in encrypted form, for payment authorization, as indicated by reference numeral 524.

The merchant payment instrument reader 190 transmits to the offer server 160 and/or the O-PIAA server 130 the specific PAN, preferably in encrypted form, and data relating to at least one purchase by the customer, preferably received from merchant barcode reader 192 or its functional equivalent, as indicated by reference numeral 526.

In one example, the merchant payment instrument reader 190 transmits the specific PAN to the offer server 160 in encrypted form. The offer server 160 decrypts the specific PAN and then reencrypts it and transmits it to the O-PIAA server 130.

In another example, the merchant payment instrument reader 190 transmits the specific PAN to the O-PIAA server 130 in encrypted form. The O-PIAA server 130 decrypts the specific PAN and then reencrypts it and transmits it to the offer server 160.

In yet another example, the merchant payment instrument reader 190 transmits the specific PAN to the O-PIAA server 130 in encrypted form.

The purchase may be a product or a service or a combination thereof, and the presentation may be, for example, in person or on-line.

The offer server 160 and/or the O-PIAA server 130 ascertains whether at least one item purchased by the customer is covered by at least one valid CSO, as indicated by reference numeral 528.

If the purchase is, or cumulative purchases are covered by at least one valid CSO, the offer server 160 and/or the O-PIAA server 130 confirms redemption of the CSO and the customer is credited accordingly, as indicated by reference numeral 530. The crediting may take place either at the time of the transaction, and be reflected in a transaction invoice or receipt, or thereafter. The crediting may be confirmed, for example, by an SMS message, via messaging server 150, such as a messaging server operated by one of a number of commercial message service suppliers, to the customer. For example, the credit may appear on a payment card statement issued by the payment card company.

Reference is now made to FIGS. 2E/1 and 2E/2, which are together a simplified flow diagram illustrating operation of still another embodiment of the payment card data system of FIG. 1. In FIGS. 2E/1 and 2E/2, various optional steps are presented and indicated in italics.

The embodiment described hereinbelow with reference to FIGS. 2E/1 and 2E/2 relates to a taxi environment and employs a payment instrument reader 110 which is located in a vehicle, such as a taxi. It is appreciated that the present invention is not limited to this embodiment and includes embodiments wherein the payment instrument reader may be in a fixed location or in another non-static location. The payment instrument reader may be stand-alone or may be connected to or form part of a point of sale device.

Reading of payment instrument data by the payment instrument reader 110 may be carried out using various different technologies, such as swiping a magnetic stripe bearing payment card, contact or contactless reading of a smart card or other chip enabled card, NFC or acoustic reading of a payment instrument. The payment instrument need not be in the form of a card but may be embodied in a mobile communication device, such as a mobile telephone.

In the embodiment illustrated in FIGS. 2E/1 and 2E/2, initially as indicated by reference numeral 600, a potential customer enters a taxi and the taxi driver starts the taxi meter.

The Customer Interface For Offer Presentation, Selection and Communication (CIFOPSC) 100 and its associated display 102 preferably displays a welcome message, as indicated by reference number 602.

The potential customer presents a payment instrument to the taxi payment instrument reader 110 associated with CIFOPSC 100, as indicated by reference number 603. The potential customer, upon entering the taxi, may run an application installed on his mobile phone, which communicates data related to the customer's payment instrument to the taxi payment instrument reader 110 associated with CIFOPSC 100.

Alternatively, a prompt to present a payment instrument is displayed on display 102.

As indicated by reference numeral 604, a potential customer presented payment instrument is read by the taxi payment instrument reader 110 and validated for use in the offer program.

The CIFOPSC display 102 presents at least one offer to the potential customer, as indicated by reference numeral 606. Displays of given offers may be dependent on various factors, such as, for example, geolocation and time of day. One example is sometimes termed dayparting, which refers to a specific subset of hours within a given day or days. Another example is geotargeting, which refers to any one or more of current location, pickup location, drop off location and airport rate code status. CIFOPSC 100 preferably takes into account all relevant rules associated with a given offer or offers.

The potential customer may select at least one offer, hereinafter termed a Customer Selected Offer (CSO), as indicated by reference numeral 608.

As indicated by reference numeral 610, the Customer Interface For Offer Presentation, Selection and Communication (CIFOPSC) 100 sends the specific PAN read by the taxi payment instrument reader 110, preferably in encrypted form, or via a token or other secure medium, to the O-PIAA server 130, which may also receive details of one or more CSOs associated with the same PAN from the O-PIAA database 170.

As indicated by reference numeral 612, the O-PIAA server 130 stores the specific PAN in encrypted form and, as indicated by reference numeral 614, associates the one or more CSOs with the specific PAN.

Optionally, as indicated by reference numeral 616, the O-PIAA server 130 communicates the specific PAN, preferably in encrypted form, and information associating the specific PAN with one or more CSOs to the payment card company offer server 160.

Optionally, as indicated by reference numeral 618, the O-PIAA server 130 communicates a message, such as an SMS message, via messaging server 150, such as a messaging server operated by one of a number of commercial message service suppliers, to the potential customer confirming association of one or more CSOs with the specific PAN.

When the potential customer, now termed "the customer" wishes to redeem one of the CSOs, the customer presents to a merchant payment instrument reader 190 the payment instrument held by the customer and having the specific PAN, previously associated with one or more CSOs, for payment authorization and settlement, as indicated by reference numeral 620.

The merchant payment instrument reader 190 transmits the specific PAN to the payment server 140 of the payment card company, preferably in encrypted form, for payment authorization, as indicated by reference numeral 622.

The merchant payment instrument reader 190 transmits to the offer server 160 and/or the O-PIAA server 130 the specific PAN, preferably in encrypted form, and data relating to at least one purchase by the customer, preferably received from merchant barcode scanner 192 or an equivalent product identification output device, as indicated by reference numeral 624.

In one example, the merchant payment instrument reader 190 transmits the specific PAN to the offer server 160 in encrypted form. The offer server 160 decrypts the specific PAN and then reencrypts it and transmits it to the O-PIAA server 130.

In another example, the merchant payment instrument reader 190 transmits the specific PAN to the O-PIAA server 130 in encrypted form. The O-PIAA server 130 decrypts the specific PAN and then re-encrypts it and transmits it to the offer server 160.

In yet another example, the merchant payment instrument reader 190 transmits the specific PAN to the O-PIAA server 130 in encrypted form.

The purchase may be a product or a service or a combination thereof, and the presentation may be, for example, in person or on-line.

The offer server 160 and/or O-PIAA server 130 ascertains whether at least one item purchased by the customer is covered by at least one valid CSO, as indicated by reference numeral 626.

If the purchase is, or cumulative purchases are covered by at least one valid CSO, the offer server 160 and/or O-PIAA server 130 confirms redemption of the CSO and the customer is credited accordingly, as indicated by reference numeral 628. The crediting may take place either at the time of the transaction, and be reflected in a transaction invoice or receipt, or thereafter. The crediting may be confirmed, for example, by an SMS message, via messaging server 150, such as a messaging server operated by one of a number of commercial message service suppliers, to the customer. For example, the credit may appear on a payment card statement issued by the payment card company.

It will be appreciated by persons skilled in the art that the present invention is not limited to what has been particularly shown and described hereinabove. Modifications and variations thereof which may occur to persons skilled in the art upon reading the foregoing as well as combinations and subcombinations of features described hereinabove, which are not in the prior art are also within the scope of the present invention.

The invention claimed is:

1. An electronic offer method comprising:
    in an offer-payment instrument account association server comprising at least one computer processor:
    receiving, from a first payment terminal device for a first merchant comprising a display, acceptance data identifying an accepted offer, the accepted offer having been presented on the display, and payment instrument data for a payment instrument;
    storing association data that associates the payment instrument data with the acceptance data;
    receiving, from a second payment terminal device for a second merchant, transaction data for a transaction comprising transaction payment instrument data for a transaction payment instrument;
    ascertaining that the transaction payment instrument data is associated with the payment instrument data;
    verifying that the transaction is covered by the accepted offer; and
    causing a payment card company for the transaction payment instrument to credit the transaction payment instrument according to the accepted offer.

2. The method of claim 1, further comprising:
    communicating the association data to the payment card company.

3. The method of claim 1, wherein the transaction data is received after the transaction is complete.

4. The method of claim 1, further comprising:
    receiving a personal contact hook for a holder of the payment instrument.

5. The method of claim 4, wherein the personal contact hook comprises at least one of a telephone number, an email address, a social network identifier and a messaging identifier.

6. The method of claim 4, further comprising:
    communicating the crediting of the transaction payment instrument to the personal contact hook.

7. The method of claim 1, wherein at least one of the first payment terminal device or the second payment terminal device comprises a point of sale device.

8. An electronic offer content server, comprising:
    at least one computer processor;
    a memory;
    wherein the electronic offer content server:
        receives, from a first payment terminal device for a first merchant, acceptance data identifying an accepted offer that was presented by a display on the payment terminal;
        receives payment instrument data for a payment instrument; associates the payment instrument data with the acceptance data; receives, from a second payment terminal device for a second merchant, transaction data for a transaction comprising transaction payment instrument data for a transaction payment instrument;
        determines, based on the payment instrument data and the transaction payment instrument data, that the acceptance data is associated with the transaction payment instrument;
        verifies that the transaction is covered by the accepted offer; and
        causes a payment card company for the transaction payment instrument to credit the transaction payment instrument according to the accepted offer.

9. The electronic offer content server of claim 8, wherein the electronic offer content server communicates the association data to the payment card company.

10. The electronic offer content server of claim 8, wherein the electronic offer content server receives the transaction data after the transaction is complete.

11. The electronic offer content server of claim 8, wherein the electronic offer content server receives a personal contact hook for a holder of the payment instrument.

12. The electronic offer content server of claim 11, wherein the personal contact hook comprises at least one of a telephone number, an email address, a social network identifier and a messaging identifier.

13. The electronic offer content server of claim 11, wherein the electronic offer content server communicates the crediting of the transaction payment instrument to the personal contact hook.

14. The electronic offer content server of claim 8, wherein at least one of the first payment terminal device or the second payment terminal device comprises a point of sale device.

* * * * *